US009906885B2

(12) United States Patent
Visser et al.

(10) Patent No.: US 9,906,885 B2
(45) Date of Patent: Feb. 27, 2018

(54) METHODS AND SYSTEMS FOR INSERTING VIRTUAL SOUNDS INTO AN ENVIRONMENT

(71) Applicant: QUALCOMM Incorporated, San Diego, CA (US)

(72) Inventors: Erik Visser, San Diego, CA (US); Lae-Hoon Kim, San Diego, CA (US); Raghuveer Peri, Los Angeles, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/238,591

(22) Filed: Aug. 16, 2016

(65) Prior Publication Data

US 2018/0020312 A1 Jan. 18, 2018

Related U.S. Application Data

(60) Provisional application No. 62/363,104, filed on Jul. 15, 2016.

(51) Int. Cl.
*H04S 7/00* (2006.01)
*H04R 5/033* (2006.01)
(Continued)

(52) U.S. Cl.
CPC ............. *H04S 7/304* (2013.01); *H04R 5/033* (2013.01); *H04S 7/306* (2013.01); *G02B 27/01* (2013.01);
(Continued)

(58) Field of Classification Search
CPC ......... H04R 5/033; H04S 7/304; H04S 7/306; H04S 2400/11; G02B 27/01; G02B 2027/0141; G06T 19/006
See application file for complete search history.

(56) References Cited

U.S. PATENT DOCUMENTS 8,170,222 B2 5/2012 Dunko
8,831,255 B2 9/2014 Crawford et al.
(Continued)

FOREIGN PATENT DOCUMENTS

EP 2866217 A1 4/2015
WO 02073287 A2 9/2002

OTHER PUBLICATIONS

Harma, A. et al.,"Augmented Reality Audio for Mobile and Wearable Appliances", J. Audio Eng. Soc., vol. 52, No. 6, Jun. 2004, pp. 618-639.
(Continued)

*Primary Examiner* — Mark Fischer
(74) *Attorney, Agent, or Firm* — Toler Law Group, P.C.

(57) ABSTRACT

A method for outputting virtual sound includes detecting an audio signal in an environment at one or more microphones. The method also includes determining, at a processor, a location of a sound source of the audio signal and estimating one or more acoustical characteristics of the environment based on the audio signal. The method further includes inserting a virtual sound into the environment based on the one or more acoustical characteristics. The virtual sound has one or more audio properties of a sound generated from the location of the sound source.

57 Claims, 14 Drawing Sheets

(51) Int. Cl.
*G02B 27/01* (2006.01)
*G06T 19/00* (2011.01)

(52) U.S. Cl.
CPC .... *G02B 2027/0141* (2013.01); *G06T 19/006* (2013.01); *H04S 2400/11* (2013.01)

(56) References Cited

U.S. PATENT DOCUMENTS

| | | | |
|---|---|---|---|
| 2002/0158873 A1* | 10/2002 | Williamson | G06T 15/20 345/427 |
| 2010/0034404 A1 | 2/2010 | Dent | |
| 2012/0027217 A1* | 2/2012 | Jun | H04S 7/30 381/58 |
| 2012/0207308 A1 | 8/2012 | Sung | |
| 2012/0239690 A1* | 9/2012 | Asikainen | G06F 17/3082 707/770 |
| 2015/0003616 A1 | 1/2015 | Middlemiss et al. | |
| 2015/0092965 A1 | 4/2015 | Umminger et al. | |
| 2016/0088417 A1* | 3/2016 | Kim | G02B 27/017 381/17 |
| 2017/0278519 A1 | 9/2017 | Visser et al. | |
| 2017/0339491 A1 | 11/2017 | Kim et al. | |

OTHER PUBLICATIONS

Begault D.R., "3-D Sound for Virtual Reality and Multimedia", NASA/TM-2000-000000, Jan. 1, 2000, pp. 1-246, XP002199910.
International Search Report and Written Opinion—PCT/US2017/034522—ISA/EPO—dated Oct. 25, 2017.
Wikipedia: "Magic Leap", Retrieved from Internet on Sep. 15, 2017, https://en.wikipedia.org/wiki/Magic_Leap, pp. 1-5.
Wikipedia: "Microsoft HoloLens", Retrieved from internet on Sep. 15, 2017, https://en.wikipedia.org/wiki/Microsoft_HoloLens, pp. 1-8.

* cited by examiner

METHODS AND SYSTEMS FOR INSERTING VIRTUAL SOUNDS INTO AN ENVIRONMENT

I. CROSS-REFERENCE TO RELATED APPLICATIONS

The present application claims priority from U.S. Provisional Patent Application No. 62/363,104, filed Jul. 15, 2016, entitled "VIRTUAL, AUGMENTED, AND MIXED REALITY," which is incorporated by reference in its entirety.

II. FIELD

The present disclosure is generally related to augmented reality.

III. DESCRIPTION OF RELATED ART

Virtual reality applications are becoming increasingly popular. For example, different devices may include features that enable users to audibly and visually experience a virtual environment. To illustrate, a user may use a device to play a video game. A display screen of the device may present virtual objects associated with the video game to the user, and speakers of the device may output sounds (e.g., virtual sounds) associated with the video game to the user. As used herein, a "virtual object" corresponds to an object that is visible to the user via a virtual reality application (e.g., the video game) but would not otherwise be visible to the user without the virtual reality application (e.g., would not be visible to the user in the "real-world"). A "virtual sound" corresponds to a sound that is audible to the user via a virtual reality application but would not otherwise be audible to the user without the virtual reality application (e.g., would not be audible to the user in the "real-world").

In certain scenarios, a person may not be able to satisfactorily enjoy real-world experiences. As a non-limiting example, if a person is looking at a humming bird that is relatively far away, the person may attempt to hear sounds (e.g., humming noises) generated by the humming bird; however, the distance between the person and the humming bird may prevent the person from hearing humming noises from the humming bird.

IV. SUMMARY

According to one implementation, an apparatus for outputting virtual sound includes one or more microphones configured to detect an audio signal in an environment. The apparatus also includes a processor coupled to the one or more microphones. The processor is configured to determine a location of a sound source of the audio signal. The processor is further configured to estimate one or more acoustical characteristics of the environment based on the audio signal. The processor is also configured to insert a virtual sound into the environment based on the one or more acoustical characteristics. The virtual sound has one or more audio properties of a sound generated from the location of the sound source.

According to another implementation, a method for outputting virtual sound includes detecting an audio signal in an environment at one or more microphones. The method also includes determining, at a processor, a location of a sound source of the audio signal and estimating one or more acoustical characteristics of the environment based on the audio signal. The method further includes inserting a virtual sound into the environment based on the one or more acoustical characteristics. The virtual sound has one or more audio properties of a sound generated from the location of the sound source.

According to another implementation, a non-transitory computer-readable medium includes instructions for outputting virtual sound. The instructions, when executed by a processor, cause the processor to perform operations including determining a location of a sound source of the audio signal and estimating one or more acoustical characteristics of the environment based on the audio signal. The operations further include inserting a virtual sound into the environment based on the one or more acoustical characteristics. The virtual sound has one or more audio properties of a sound generated from the location of the sound source.

According to another implementation, an apparatus for outputting virtual sound includes means for detecting an audio signal in an environment. The apparatus also includes means for determining a location of a sound source of the audio signal and means for estimating one or more acoustical characteristics of the environment based on the audio signal. The apparatus further includes means for inserting a virtual sound into the environment based on the one or more acoustical characteristics. The virtual sound has one or more audio properties of a sound generated from the location of the sound source.

According to another implementation, an apparatus for outputting sound includes a memory and a processor coupled to the memory. The processor is configured to determine one or more acoustical characteristics at one or more locations of an environment. The processor is further configured to receive a user selection indicating a particular object and to receive a user indication of a particular location. The processor is also configured to determine one or more audio properties of a sound generated from the particular location based on the one or more acoustical characteristics. The processor is further configured to insert a virtual sound associated with the particular object into the environment. The virtual sound has the one or more audio properties.

According to another implementation, a method for outputting sound includes determining one or more acoustical characteristics at one or more locations of an environment. The method further includes receiving a user selection indicating a particular object and receiving a user indication of a particular location. The method also includes determining one or more audio properties of a sound generated from the particular location based on the one or more acoustical characteristics. The method further includes inserting a virtual sound associated with the particular object into the environment. The virtual sound has the one or more audio properties.

According to another implementation, a non-transitory computer-readable medium includes instructions for outputting sound. The instructions, when executed by a processor, cause the processor to perform operations including determining one or more acoustical characteristics at one or more locations of an environment. The operations further include receiving a user selection indicating a particular object and receiving a user indication of a particular location. The operations also include determining one or more audio properties of a sound generated from the particular location based on the one or more acoustical characteristics. The operations further include inserting a virtual sound associated with the particular object into the environment. The virtual sound has the one or more audio properties.

According to another implementation, an apparatus for outputting sound includes means for determining one or more acoustical characteristics at one or more locations of an environment. The apparatus further includes means for receiving a user selection indicating a particular object and means for receiving a user indication of a particular location. The apparatus also includes means for determining one or more audio properties of a sound generated from the particular location based on the one or more acoustical characteristics. The apparatus further includes means for inserting a virtual sound associated with the particular object into the environment. The virtual sound has the one or more audio properties.

V. BRIEF DESCRIPTION OF THE DRAWINGS

VI. DETAILED DESCRIPTION

Figure 1:
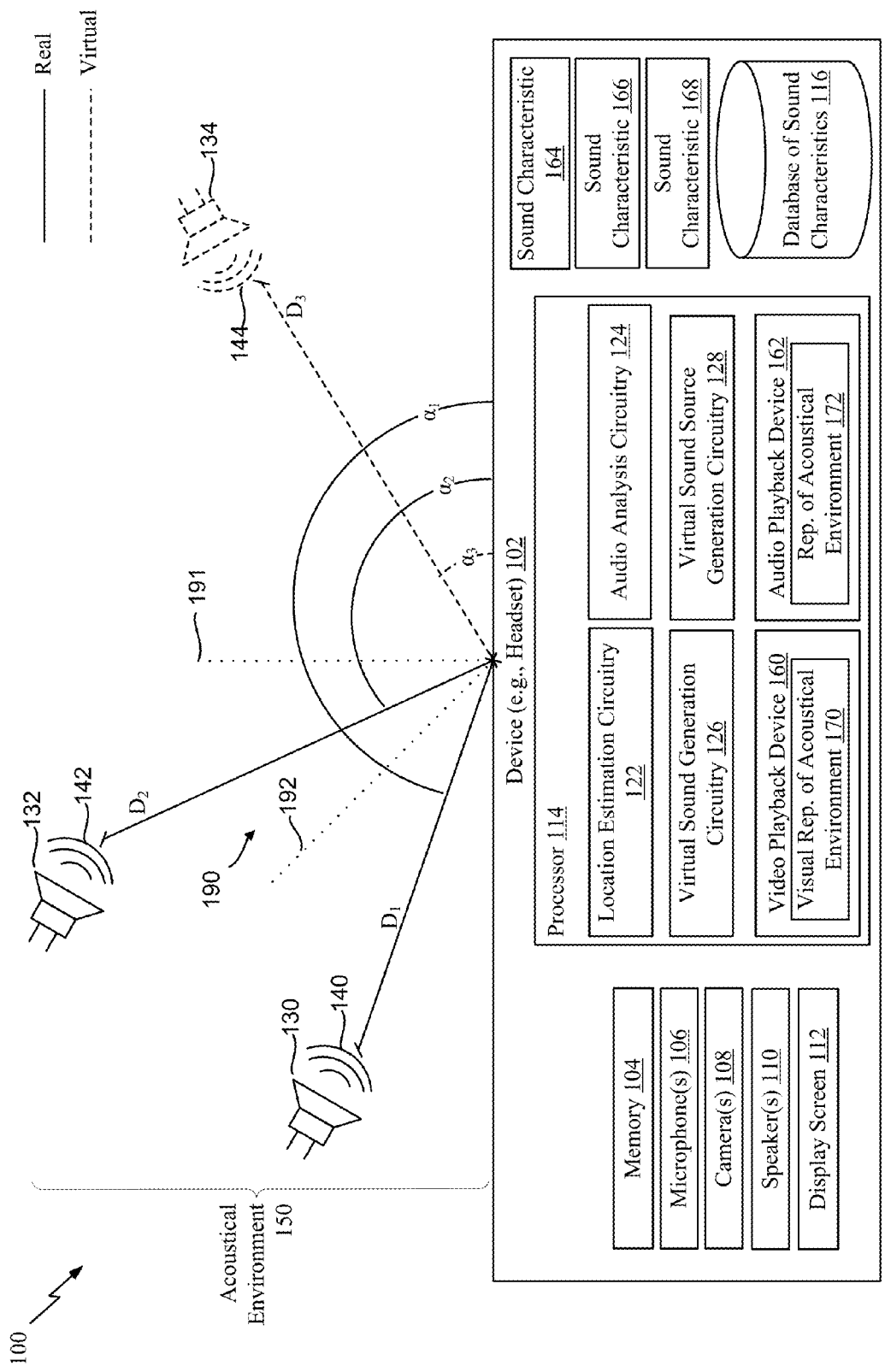
FIG. 1 is a system that is operable to combine virtual sound and virtual images into a real-world environment.

Referring to FIG. 1, a system 100 that is operable to combine virtual sound and virtual images into a real-world environment is shown. The system 100 includes a device 102 that is located in an acoustical environment 150. According to one implementation, the device 102 includes a headset that is configured to generate a virtual reality scene, a mixed reality scene, or an augmented reality scene. As used herein, a "virtual reality scene" is a scene that includes virtual components (e.g., one or more virtual sounds and/or one or more virtual objects). Typically, there are no real-world components (e.g., real-world sounds or real-world objects) in a virtual reality scene. As used herein, an "augmented reality scene" is a scene that includes one or more virtual components and one or more real-world components. As used herein, a "mixed reality scene" is a scene that includes one or more virtual components and one or more real-world components. Typically, in a mixed reality scene, the virtual components have properties (e.g., characteristics) that are similar to properties of the real-world components so that distinguishing between the virtual components and the real-world components using human senses may be difficult. For example, a mixed reality scene includes a relatively "smooth" or seamless blend of virtual components and real-world components.

The device 102 includes a memory 104, one or more microphones 106, one or more cameras 108, one or more speakers 110, a display screen 112, a processor 114, and a database of sound characteristics 116. Components of the device 102 may be coupled together. As a non-limiting example, the one or more microphones 106 may be coupled to the processor 114, the memory 104 may be coupled to the processor 114, the one or more cameras 108 may be coupled to the processor 114, etc. As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The components included in the device 102 are for illustrative purposes only and are not construed to be limiting. According to one implementation, the device 102 may include additional (or fewer) components. As a non-limiting example, the device 102 may also include a volume adjuster, one or more biofeedback sensors or other sensors (e.g., an accelerometer), one or more communication components (e.g., a radiofrequency (RF) transceiver for wireless communications), etc. The processor 114 includes location estimation circuitry 122, audio analysis circuitry 124, virtual sound generation circuitry 126, virtual sound source generation circuitry 128, a video playback device 160, and an audio playback device 162. The components included in the processor 114 are for illustrative purposes only and are not construed to be limiting. According to some implementations, two or more components in the processor 114 may be combined into a single component or a single processing unit.

The acoustical environment 150 includes "real" (e.g., real-world) objects and real sounds. For example, the acoustical environment 150 includes a sound source 130 and a sound source 132. Each sound source 130, 132 may be an object that generates sound. Non-limiting examples of sounds sources are animals, people, automobiles, machines, etc. The sound source 130 may be a distance ($D_1$) from the device 102 according to an angular location ($\alpha_1$). The sound source 132 may be a distance ($D_2$) from the device 102 according to an angular location ($\alpha_2$). Although in some implementations angular location includes an angular coordinate (e.g., 115 degrees), in other implementations angular location may include a region between two angular coordinates, such as a region 190 between a first angular coordinate 191 (e.g., 90 degrees) and a second angular coordinate 192 (e.g., 135 degrees). The sound source 130 may be configured to generate an audio signal 140, and the sound source 132 may be configured to generate an audio signal 142. As explained below, each audio signal 140, 142 may have one or more sound characteristics.

The location estimation circuitry 122 of the processor 114 may be configured to determine visual parameters of the sound sources 130, 132. To illustrate, the one or more cameras 108 may capture a visual representation 170 of the acoustical environment 150. The one or more cameras 108 may be proximate to an audio capture device (e.g., proximate to the one or more microphones 106). Initially (e.g., prior to addition of mixed reality applications, as described below), the visual representation 170 of the acoustical environment 150 may depict the real objects in the acoustical environment 150. For example, the visual representation 170 of the acoustical environment 150 may initially depict the sound source 130 and the sound source 132.

The video playback device 160 may process (e.g., "render") the visual representation 170 of the acoustical environment 150 in response to the one or more cameras 108 capturing the visual representation 170 of the acoustical environment 150. After the visual representation 170 of the acoustical environment 150 is processed by the video playback device 160, the location estimation circuitry 122 may use location estimation techniques to determine the distance ($D_1$) of the sound source 130 from the device 102 and the angular location ($\alpha_1$) of the sound source 130 based on the rendering. The location estimation circuitry 122 may also use location estimation techniques to determine the distance ($D_2$) of the sound source 130 from the device 102 and the angular location ($\alpha_2$) of the sound source 130 based on the rendering. The video playback device 160 may display the visual representation 170 of the acoustical environment 150 on the display screen 112. Displaying the visual representation 170 of the acoustical environment 150 on the display screen 112 is described in greater detail with respect to FIG. 3.

The audio analysis circuitry 124 of the processor 114 may be configured to determine sound characteristics 164, 166 of the audio signals 140, 142. To illustrate, the one or more microphones 106 may be configured to detect the audio signals 140, 142. The audio analysis circuitry 124 may determine a sound characteristic 164 of the audio signal 140 in response to the one or more microphones 106 detecting the audio signal 140. For example, the audio analysis circuitry 124 may determine at least one reverberation characteristic of the audio signal 140. According to one implementation, the at least one reverberation characteristic may include a direct-to-reverberation ratio (DRR) of the audio signal 140. The audio analysis circuitry 124 may store the sound characteristic 164 of the audio signal 140 (along with the corresponding visual parameters of the sound source 130 determined by the location estimation circuitry 122) in a database of sound characteristics 116. The database of sound characteristics 116 may associate sound characteristics with sound source location information. Although the sound characteristic 164 is described as a reverberation characteristic, in other implementations, the sound characteristic 164 may include one or more other reverberation characteristics, a room impulse response (RIR), a head-related transfer function (HRTF), one or more other characteristics, or a combination thereof.

In a similar manner, the audio analysis circuitry 124 may determine a sound characteristic 166 of the audio signal 142 in response to the one or more microphones 106 detecting the audio signal 142. For example, the audio analysis circuitry 124 may determine at least one reverberation characteristic of the audio signal 142. According to one implementation, the at least one reverberation characteristic may include a DRR of the audio signal 142. The audio analysis circuitry 124 may store the sound characteristic 166 of the audio signal 142 (along with the corresponding visual parameters of the sound source 132 determined by the location estimation circuitry 122) in the database of sound characteristics 116.

According to one implementation, the sound characteristics 164, 166 may be affected based on characteristics of the acoustical environment 150. The processor 114 may determine whether the acoustical environment 150 corresponds to an indoor environment, an outdoor environment, a partially enclosed environment, etc. The reverberation components of the sound characteristics 164, 166 may be altered by the characteristics of the acoustical environment 150, such as when the sound sources 130, 132 are in an open field as compared to when the sound sources 130, 132 are in an elevator.

The audio playback device 162 may generate an audio representation 172 of the acoustical environment 150. Initially (e.g., prior to addition of mixed reality applications, as described below), the audio representation 172 of the acoustical environment 150 may include sound associated with the audio signal 140 and sound associated with the audio signal 142. The audio representation 172 of the acoustical environment 150 may be outputted using the one or more speakers 110. For example, the audio playback device 162 may provide the audio representation 172 of the acoustical environment 150 to a user of the headset (e.g., the device 102) using the one or more speakers 110 (e.g., headphones).

The sound associated with the audio signal 140 in the audio representation 172 may be generated to have a direction of arrival based on the angular location ($\alpha_1$) and to have a volume (e.g., a sound level) based on the distance ($D_1$). For example, if the distance ($D_1$) is relatively large, the volume of the sound associated with audio signal 140 may be relatively low. Thus, the audio playback device 162 may generate the sound associated with the audio signal 140 based on visual parameters of the sound source 130 and the sound characteristic 164. In other implementations, the audio playback device 162 may use the audio signal 140 as detected by the one or more microphones 106 to generate the sound associated with the audio signal 140 in the audio representation 172. For example, the audio playback device may generate the sound associated with audio signal 140 by "playing back" the audio signal 140 as detected by the one or more microphones 106. The sound associated with the audio signal 142 in the audio representation 172 may be generated to have a direction of arrival based on the angular location ($\alpha_2$) and to have a volume (e.g., a sound level) based on the distance ($D_2$). Thus, the audio playback device 162 may generate the sound associated with the audio signal 142 based on visual parameters of the sound source 132 and the sound characteristic 166. In other implementations, the audio playback device 162 may generate the sound associated with audio signal 142 by "playing back" the audio signal 142 as detected by the one or more microphones 106.

Figure 5:
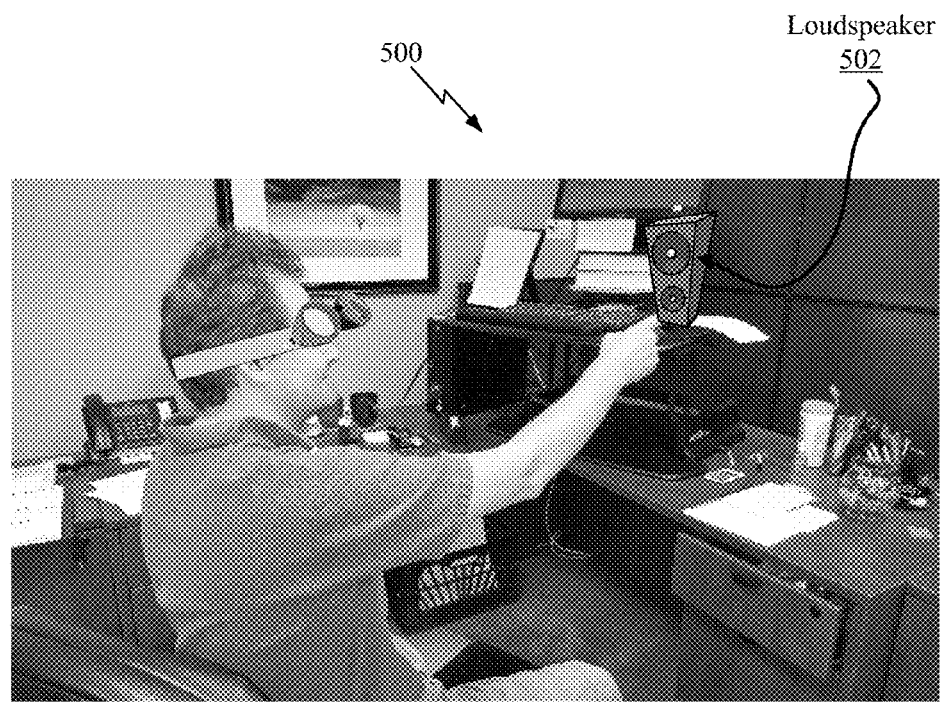
FIG. 5 depicts an example of inserting one or more virtual sounds into an environment.
Figure 5:
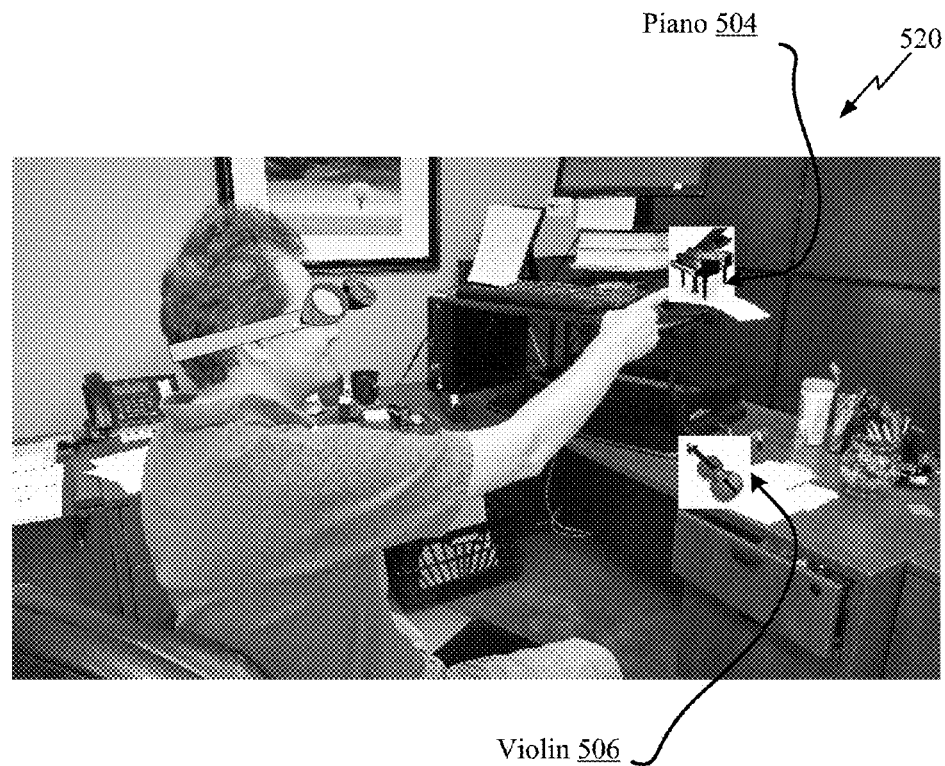

According to one implementation, one or more of the audio signals 140, 142 may be generated based on user-initiated playback of an audio device. As a non-limiting example, the sound source 130 may include a loudspeaker and the user-initiated playback may include generation of the audio signal 140 from the loudspeaker. To illustrate, referring to a first example 500 in FIG. 5, a loudspeaker 502 may be placed on a user's hand. The loudspeaker 502 may generate audio signals at different locations of the environment using the loudspeaker 502. A headset may determine acoustical characteristics (e.g., a room impulse response (RIR) and a head-related transfer function (HRTF)) based on sound generated by the loudspeaker 502. For example, the headset may include one or more microphones configured to detect each audio signal generated by the loudspeaker 502. The user may move his hand, and thus the loudspeaker 502, to different location of the environment to determine the acoustical characteristics. The headset may also update filters based on the RIR and the HRTF to generate virtual sounds within the environment.

After the headset determines the acoustical characteristics at different locations of the environment, the user may provide a user selection indicating a particular object to the headset. To illustrate, referring to a second example 520, the user may provide a user selection of a piano 504 to the headset. The user may also provide a user indication of a particular location of the environment. For example, the user may wear a wearable sensor on the user's finger. The wearable sensor may indicate the particular location. The headset may determine one or more audio properties of a sound generated from the particular location based on the acoustical characteristics at the different locations. For example, the headset may use the RIR and HRTF to determine audio properties associated with the location indicated by the wearable sensor. The headset may generate a virtual sound (e.g., a piano sound) associated with the particular object (e.g., the piano 504). The virtual sound may have the one or more audio properties, and the headset may output a sound signal based on the virtual sound.

Additionally, the user may provide a user selection indicating another particular object to the headset. To illustrate, referring to the second example 520, the user may provide a user selection of a violin 506 to the headset. The user may also provide a user indication of a second particular location via the wearable sensor. The headset may determine one or more audio properties of a sound generated from the second particular location based on the acoustical characteristics at the different locations. The headset may generate a second virtual sound (e.g., a violin sound) associated with the violin 506. The virtual sound may have the one or more audio properties, and the headset may output a sound signal based on the virtual sound.

According to one implementation, the object sound may remain (e.g., continuously be played) without the user's hand at the location of the corresponding virtual object if a particular amount of time has transpired (e.g., enough time to generate filter acoustics has transpired). For example, if the headset has determined the characteristics (e.g., reverberation characteristics, RIR, and HRTF) at the position of the user's hand, a virtual sound may continuously play at the position after the user moves his or her hand. Thus referring back to FIG. 1, the audio analysis circuitry 124 may generate the sound characteristic 164 of the audio signal 140 based on audio playback associated with a user's hand position.

According to one implementation, one or more of the audio signals 140, 142 may be generated without user-initiated playback of an audio device. As a non-limiting example, the sound source 132 may include an animal (or other object not under control of the user) that generates the audio signal 142.

The processor 114 may be configured to generate virtual components (e.g., virtual objects and/or virtual sounds), apply one or more virtual components to the visual representation 170 of the acoustical environment 150 displayed at the display screen 112 to generate a mixed or augmented visual scene, and apply one or more virtual components to the audio representation 172 of the acoustical environment 150 outputted at the one or more speakers 110 to generate mixed or augmented audio. For example, the virtual sound generation circuitry 126 may be configured to generate a virtual sound 144, and the virtual sound source generation circuitry 128 may be configured to generate a virtual sound source 134.

To illustrate, the virtual sound source generation circuitry 128 may generate the virtual sound source 134, and the video playback device 160 may be configured to modify the visual representation 170 of the acoustical environment 150 by inserting the virtual sound source 134 into the visual representation 170. The modified visual representation 170 may be displayed at the display screen 112, as described in further detail with respect to FIG. 3. Based on the modified visual representation 170, the location estimation circuitry 122 may be configured to determine visual parameters of the virtual sound source 134. To illustrate, the location estimation circuitry 122 may use location estimation techniques to determine visual parameters corresponding to a distance ($D_3$) of the virtual sound source 134 from the device 102 and an angular location ($\alpha_3$) of the virtual sound source 134.

The virtual sound generation circuitry 126 may be configured to generate the virtual sound 144 based on one or more of the sound characteristics 164, 166 of the audio signals 140, 142, respectively, in such a manner that the virtual sound 144 may be perceived by a user of the device 102 to come from the virtual sound source 134. To illustrate, the virtual sound source 134 may be a bird and the virtual sound 144 may include a bird chirp sound. The bird chirp sound may be retrieved from a sound database and modified by the virtual sound generation circuitry 126 to enhance the user's perception that the virtual sound 144 originates from the virtual sound source 134. For example, the virtual sound generation circuitry 126 may determine one or more reverberation characteristics of the virtual sound 144 based on the reverberations characteristics (e.g., the sound characteristics 164, 166 stored in the database of sound characteristics 116) of the audio signals 140, 142. To illustrate, the virtual sound generation circuitry 126 may compare the location (e.g., the distance ($D_3$) and the angular location ($\alpha_3$)) of the virtual sound source 134 to the visual parameters associated with sound characteristics 164, 166 in the database of sound characteristics. If the virtual sound generation circuitry 126 determines that the distance ($D_2$) is substantially similar to the distance ($D_3$), the virtual sound generation circuitry 126 may generate reverberation characteristics for the virtual sound 144 that are substantially similar to the reverberation characteristics of the audio signal 142.

Figure 2:
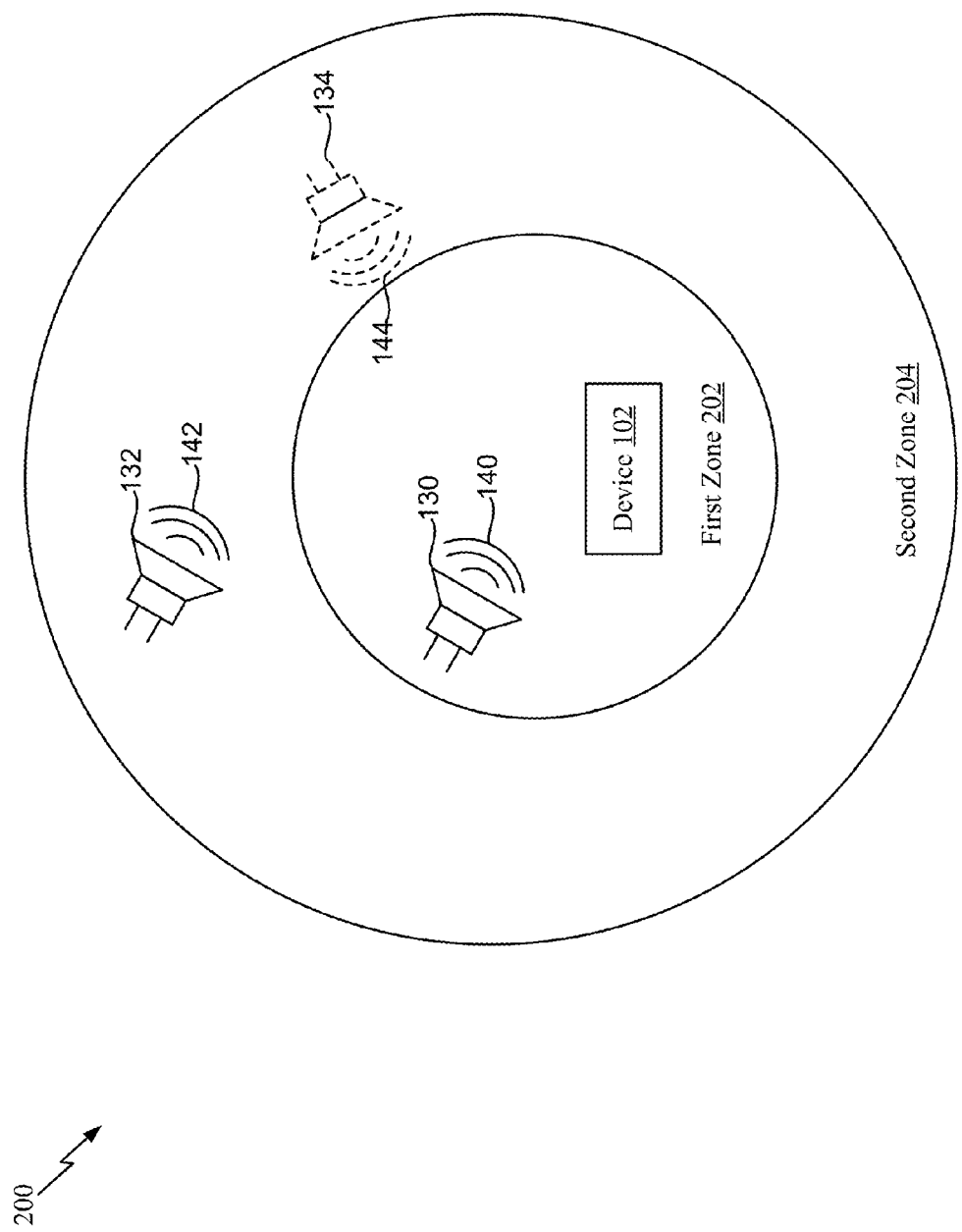
FIG. 2 depicts real-world sound sources and virtual sound sources in different zones with respect to a location of a device that is operable to combine virtual sound and virtual images into a real-world environment.

As explained in greater detail with respect to FIG. 2, the virtual sound generation circuitry 126 may determine whether the sound sources 130, 132 are located in one or more acoustic zones, such as a first zone of the acoustical environment 150 or a second zone of the acoustical environment 150. The sound characteristic 168 of the virtual sound 144 may be substantially similar to the sound characteristic 164 of the audio signal 140 if the virtual sound source 134 is located in the same zone as the sound source 130. The sound characteristic 168 of the virtual sound 144 may be substantially similar to the sound characteristic 166 of the audio signal 142 if the virtual sound source 134 is located in the same zone as the sound source 132. The sound characteristic 168 of the virtual sound 144 may be different than the sound characteristic 164 of the audio signal 140 if the virtual sound source 134 is located in a different zone than the sound source 130. The sound characteristic 168 of the virtual sound 144 may be different than the sound characteristic 166 of the audio signal 142 if the virtual sound source 134 is located in a different zone than the sound source 132.

The virtual sound generation circuitry 126 may also be configured to determine a direction-of-arrival of the virtual sound 144 based on the location of the virtual sound source 134 associated with the virtual sound 144. For example, the virtual sound generation circuitry 126 may determine (from the location estimation circuitry 122) the angular location ($\alpha_3$) of the virtual sound source 134. Based on the angular location ($\alpha_3$), the virtual sound generation circuitry 126 may pan the virtual sound 144 such that the user of the device 102 hears the virtual sound 144 as if the virtual sound 144 is coming from the direction of the virtual sound source 134. Thus, the virtual sound generation circuitry 126 may generate the virtual sound 144 based on the one or more reverberation characteristics (e.g., the sound characteristic 168) and the direction-of-arrival.

The audio playback device 162 may be configured to modify the audio representation 172 of the acoustical environment 150 by inserting the virtual sound source 134 into the audio representation 172. The modified audio representation 172 of the acoustical environment 150 may be outputted at the one or more speakers 110. For example, the audio playback device 162 may output a sound signal (based on the virtual sound 144) at one or more loudspeakers of the headset.

As described above, the bird chirp sound may be retrieved from the sound database. The bird chirp sound retrieved from the sound database may include a digital representation of an audio signal. The virtual sound generation circuitry 126 may be configured to spatially filter the digital representation of the audio signal based on the sound characteristics 164, 166 to generate a spatially-filtered audio file. The virtual sound source generation circuitry 128 may be configured to generate a spatially-filtered audio signal based on the spatially-filtered audio file and to send the spatially-filtered audio signal to the one or more speakers 110. The one or more speakers 110 may be configured to project the spatially-filtered audio signal as spatially-filtered sound. The spatially-filtered sound may include the virtual sound 144. According to one implementation, the virtual sound 144 includes a computer-generated sound.

According to one implementation, the one or more cameras 108 may be configured to capture a visual scene, such as the visual depiction of the acoustical environment 150. After the virtual sound source generation circuitry 128 inserts an image of the virtual sound source 134 into the visual representation 170 of the acoustical environment 150 (e.g., the visual scene), the location estimation circuitry 122 may determine the location of the virtual sound source 134 in the visual scene. The location may indicate the distance ($D_3$) of the virtual sound source 134 from the one or more cameras 108 and the angular location ($\alpha_3$) of the virtual sound source 134 with respect to the one or more cameras 108. According to one implementation, the location estimation circuitry 122 may determine the distance ($D_3$) at least partially based on a depth map corresponding to the visual scene. As described above and with respect to FIG. 2, the virtual sound generation circuitry 126 may determine one or more sound characteristics (e.g., the sound characteristic 168) of the virtual sound 144 based on the location of the virtual sound source 134. The virtual sound generation circuitry 126 may generate the virtual sound 144 based on the one or more sound characteristics, and the audio playback device 162 may output a sound signal (at the one or more speakers 110) based on the virtual sound 144 by modifying the acoustical representation 172 of the acoustical environment 150 to include the virtual sound 144.

The system 100 of FIG. 1 may enable virtual objects to be inserted in the visual representation 170 of the acoustical environment 150 to generate a visual mixed reality scene at the display screen 112. For example, objects that are not present in the acoustical environment 150 may be virtually inserted in to the visual representation 170 of the acoustical environment 150 to enhance user enjoyment. Additionally, the system 100 may enable virtual sounds to be inserted in the audio representation 172 of the acoustical environment to generate an audio mixed reality at the one or more speakers 110. According to one implementation, virtual sounds may be added to virtual objects, such as the virtual sound source 134. According to one implementation, virtual sounds may be added to real-world objects, such as the sound source 130 and/or the sound source 132. Adding virtual sounds to real-world objects may enable users to "hear" sounds from objects that are relatively far away (e.g., hear sounds from objects that would not otherwise be audible to the user without virtual reality applications).

FIG. 2 depicts an example of real-world sound sources and virtual sound sources in different zones with respect to a location of the device 102 of FIG. 1. The acoustical environment 150 of FIG. 1 is illustrated as including a plurality of zones that includes a first zone 202 and a second zone 204. According to other implementations, the acoustical environment 150 may include more than two zones. The zones 202, 204 may include concentric circles having center points located at or near the microphone(s) 106 of the device 102. For example, the microphone(s) 106 may include a circular array of microphones, where each microphone is positioned to capture audio in a different direction. The first zone 202 is closer to the device 102 than the second zone 204. Although FIG. 2 depicts two zones 202, 204 in the form of concentric circles, the techniques described herein may be applicable using zones with different geometries. As a non-limiting example, each of the zones 202, 204 may include a rectangular section having a center point located at the device 102.

The processor 114 of the device 102 may be configured to determine, based on the angular location and the distance, whether a particular sound source is located in the first zone 202 or in the second zone 204. For example, the audio analysis circuitry 124 may determine the first sound source 130 is located in the first zone 202 based on the distance ($D_1$) between the first sound source 130 and the device 102 (e.g., the microphone(s) 106) and based on the first angular location of the first sound source 130 (e.g., relative to the microphone(s) 106). In a similar manner, the processor 114 may determine the second sound source 132 is located in the second zone 204 based on the distance ($D_2$) between the second sound source 132 and the device 102 and based on the second angular location of the second sound source 132 (e.g., relative to the microphone(s) 106). As described with reference to FIG. 1, the processor 114 may determine the first sound characteristic 164 corresponding to the first audio signal 140 and the second sound characteristic 166 corresponding to the second audio signal 142.

The processor 114 may determine that the virtual sound signal 144 originates from a source (the virtual sound source 134) that is located in the second zone 204 based on the distance ($D_3$) between the virtual sound source 134 and the device 102 and based on the third angular location ($\alpha_3$) of the virtual sound source 134. To generate the virtual sound signal 144, the processor 114 may retrieve a sound signal corresponding to the virtual source (e.g., a bird chirp) from a database of virtual sounds and may apply the second sound characteristic 166 to the retrieved sound signal so that the sound characteristic(s) of the virtual sound 144 from the second zone 204 mimics the sound characteristic(s) of the real-world sound (the audio signal 142) from the second sound source 132. Alternatively, if the virtual sound source 134 were determined to be in the first zone 202 rather than in the second zone 204, the processor 114 may instead apply the first sound characteristic 164 to the retrieved sound signal so that the sound characteristic(s) of the virtual sound 144 from the first zone 204 mimics the sound characteristic(s) of the real-world sound (the audio signal 140) from the first sound source 130.

By selecting one or more sound characteristics of a virtual sound based on measured (e.g., sensed, calculated, detected, etc.) sound characteristics of one or more other sound sources in the same zone, the virtual sound may be perceived as more realistic by a user with reduced computational complexity as compared to using another technique to determine the sound characteristics of the virtual sound. For example, determination of sound characteristics of a virtual sound may be performed independent of other sound signals by accessing stored tables of sound data based on the distance and direction of arrival of the virtual sound and further based on one or more properties of the acoustical environment (e.g., presence or absence of and distance from ceiling or walls, presence or absence of and distance from reflective or absorbent structures or materials, etc.). By using measured sound characteristics of real-world sounds and the approximation that sounds coming from a similar spatial location (e.g., the same zone) have a similar sound characteristic (e.g., a same reverberation characteristic), a more realistic virtual sound may be generated as compared to the table-based approach described above.

Figure 3:
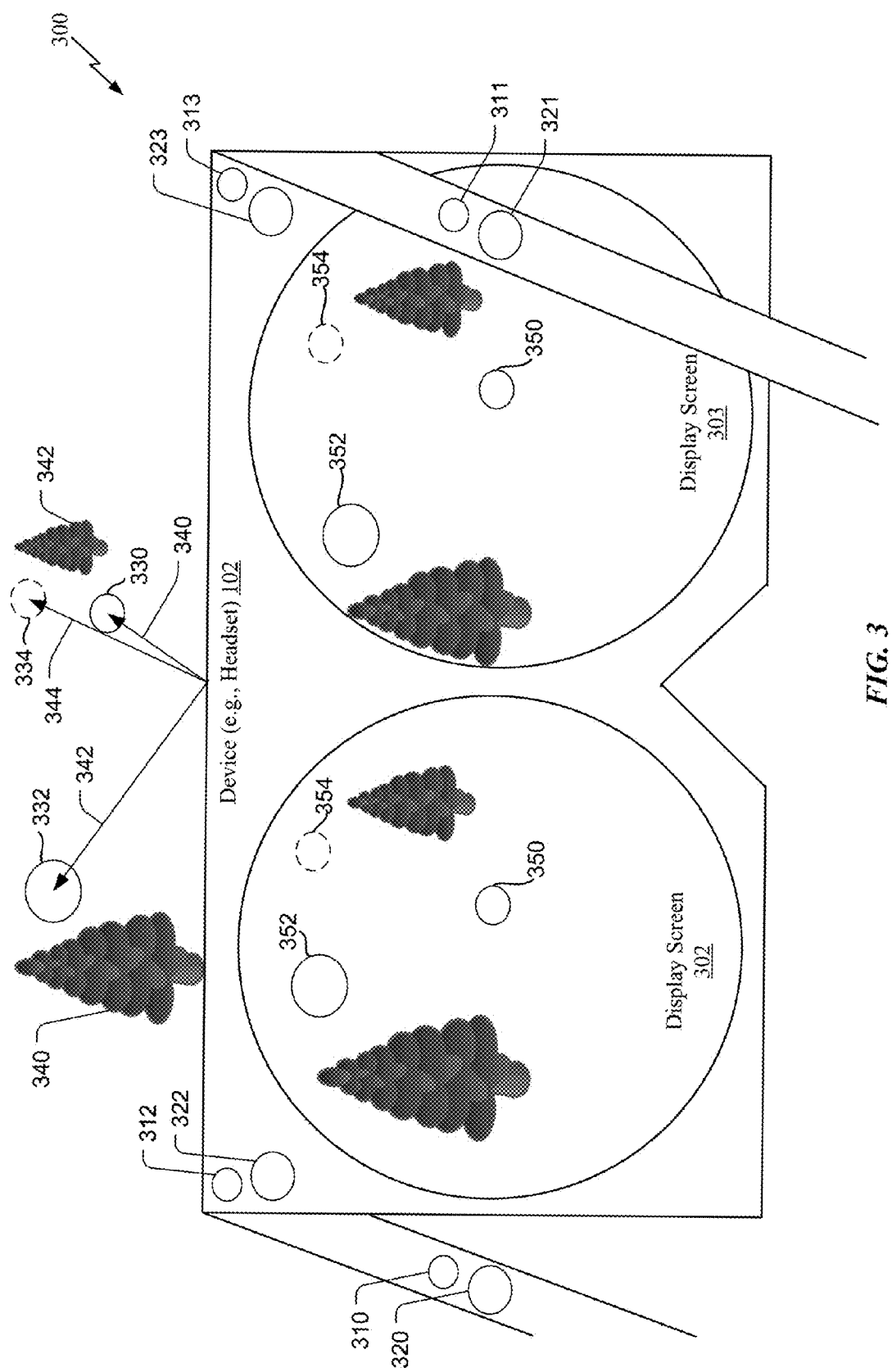
FIG. 3 depicts an augmented reality scene from a viewpoint of a headset that is operable to combine virtual sound and virtual images into a real-world environment.

FIG. 3 depicts a mixed reality scene from a viewpoint of a headset that is operable to combine virtual sound and virtual images into a real-world environment. The device 102 is depicted from a user's perspective as a headset having left display screen 302, a right display screen 303, microphones 310, 311, 312, and 313 (e.g., an array of microphones), and loudspeakers 320-323 (e.g., an array of speakers). The display screens 302-303 may collectively correspond to the display screen 112 of FIG. 1, the microphones 310-313 may correspond to the microphones 106 of FIG. 1, and the loudspeakers 320-323 may correspond to the speakers 110 of FIG. 1. The device 102 is in an environment that includes a first tree 340 that is closer to the device 102 than a second tree 342. The environment also includes a first sound source 330 and a second sound source 332.

The device 102 may be configured to provide one or more of a virtual reality experience, a mixed reality experience, or a mixed reality experience to the wearer of the device 102. For example, the left display screen 302 may display a left scene for the user's left eye and the right display screen 303 may display a right scene for the user's right eye to enable stereo vision. In some implementations, the display screens 302 and 303 are opaque and generate representations of the visual scene (e.g., including an image 350 of the first sound source 330 and an image 352 of the second sound source 332) with one or more embedded virtual objects (e.g., a virtual source 354). In some implementations, the displays 302 and 303 overlay the one or more embedded virtual objects onto the visual scene. In some implementations, the device 102 may include a single display rather than the two displays 302-303 that may provide three-dimensional (3D) viewing or that may provide two-dimensional (2D) viewing.

The device 102 may be configured to augment the visual environment with virtual objects, augment the acoustical environment with virtual sounds, or a combination thereof. As a first example, the device 102 may generate a virtual sound to be perceived by the user as originating at a real-world sound source. The device 102 may determine that the second tree 342 is to be used as a source of a virtual sound (e.g., a singing tree in a gaming application). For example, the second tree 342 may be selected based on the user, such as via identifying the user pointing, tracking user eye movement or gaze, or speech recognition of the user (e.g., identifying the second tree 342).

In a first implementation, the device 102 may detect a first sound from the first sound source 330 (e.g., a dog barking) and a second sound from the second sound source 332 (e.g., a person talking). The device 102 may determine a first distance 340 and direction of arrival corresponding to the first sound source 330 and may determine a second distance 342 and direction of arrival corresponding to the second sound source 332. The device 102 may determine a first sound characteristic of the first sound and a second sound characteristic of the second sound. The device 102 may determine (e.g., via a depth map) that a distance to the second tree 342 is relatively closer to the first distance 340 than to the second distance 342 (or that the second tree 342 is in a same zone as the first sound source 330 and in a different zone from the second sound source 332, such as described in FIG. 2). The device 102 may select a sound characteristic of the virtual sound (e.g., the voice of the singing tree) based on the first sound characteristic of the first sound from the first sound source 330.

In a second implementation of the first example, a user of the device 102 may position a sound source (e.g., a loudspeaker) at or near the second tree 342. The device 102 may determine a first sound characteristic based on an audio signal that is received from the sound source (e.g., via a user initiated playback of a selected audio signal). The device 102 may use the first sound characteristic as a sound characteristic of the virtual sound (e.g., the voice of the singing tree).

In a third implementation of the first example, the device 102 may implement a table-based determination of the sound characteristic of the virtual sound without using sound characteristics of real-world sounds in the acoustical environment. The device 102 may estimate the distance and direction to the second tree 342, estimate one or more acoustic conditions (e.g., whether the device 102 in an enclosed space or open space), and initiate one or more table lookup operations and computations to generate a sound characteristic of the virtual sound.

As a second example, the device 102 may generate a virtual sound source to be displayed to the user as a source of a real-world sound. For example, a third sound source 334 may be partially or completely hidden, obscured, or otherwise difficult to visually perceive. The device 102 may detect an audio signal from the third sound source 334 and may estimate a location of the third sound source 334 based on one or more characteristics of the detected sound. After estimating the location of the third sound source 334, the device 102 may add a virtual sound source 354 onto the display screens 302-303 to enable a user to visually discern a source of the sound.

In a first implementation of the second example, the device 102 may estimate the location of the third sound source 334 at least partially by comparing one or more sound characteristics of the detected audio signal to sound characteristics of other audio signals of the acoustical environment, such as audio signals from the first sound source 330 and from the second sound source 332 having characteristics stored in the database 116 of FIG. 1. A distance from the device 102 to the third sound source 334 may be estimated based on the comparison and based on the distances 340 and 342 (e.g., a distance to the third sound source 334 may be estimated using a distance to, or a zone region that includes, a sound source based on a similarity with the sound characteristics of the detected sound). A direction of arrival may be estimated by the device 102, such as via phase differences of the audio signal at different microphones 310-313 of the device 102.

In a second implementation of the second example, the device 102 may estimate the location of the third sound source 334 at least partially by comparing one or more sound characteristics of the detected audio signal to sound characteristics of played back audio signals. For example, the device 102 may determine or may store in the database 116 sound characteristics based on one or more audio signals that are received from one or more sound sources (e.g., via a user initiated playback of a selected audio signal from a loudspeaker at one or more locations in the scene).

As a third example, the device 102 may generate a virtual sound and a virtual sound source to be displayed to the user as a source of the virtual sound. For example, the device 102 may augment the acoustical and visual environment by adding the third sound source 334 as a virtual sound source and adding a virtual sound from the third sound source 334. The device 102 may select the location of the third sound source 334 (e.g., based on a gameplay scenario) and may display a visual representation of the virtual sound source 354 at an appropriate location in the displays 302-303 to appear as if the third sound source 334 were in the real-world visual scene. The device 102 may select one or more sound characteristics of the virtual sound from the virtual sound source 334 using one or more of the implementations described above (e.g., based on audio signals from one or more similarly-located real-world sound sources).

Figure 4A:
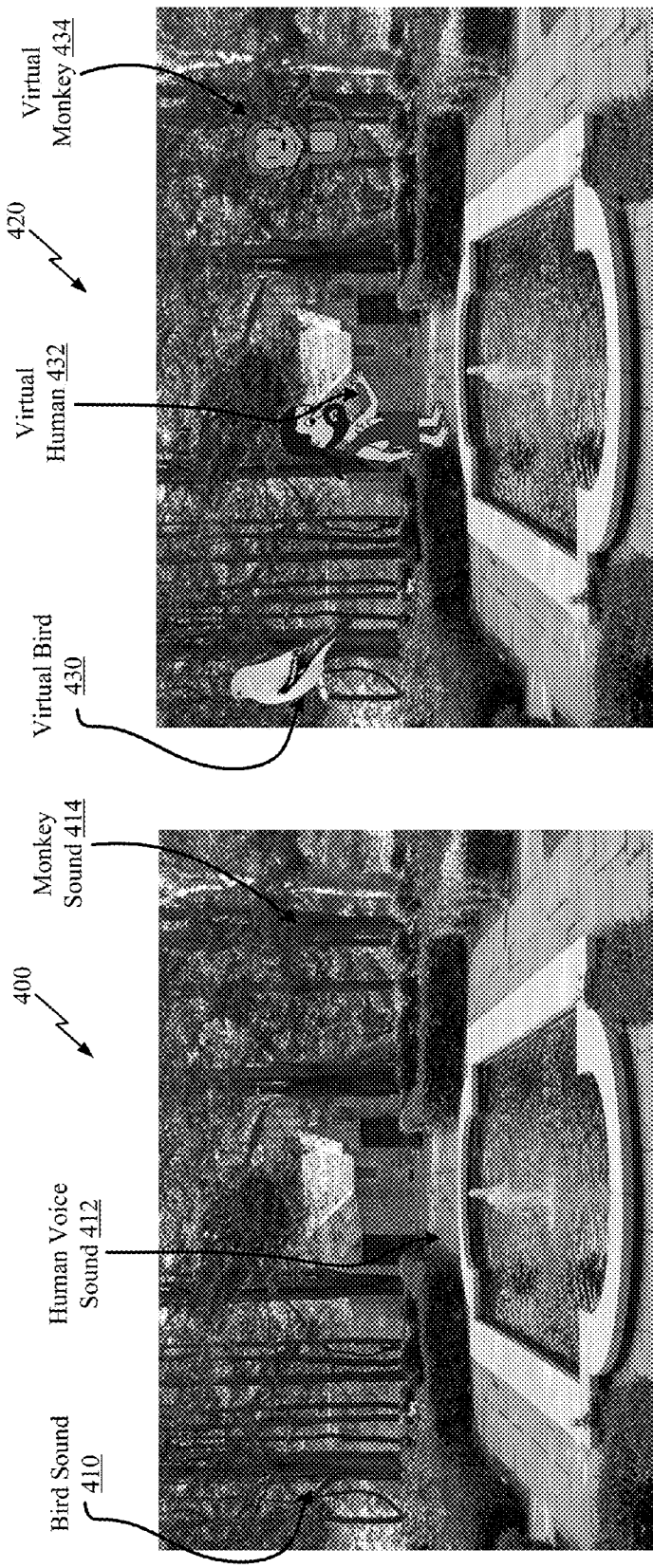
FIG. 4A depicts an example of a method of inserting one or more virtual objects into a scene based on one or more detected sounds.
Figure 4A:
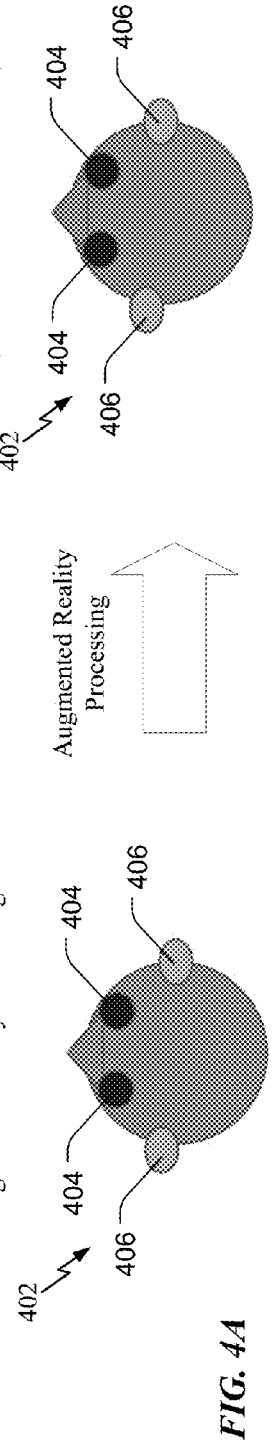

Referring to FIG. 4A, an example of inserting virtual objects into a scene based on one or more detected sounds is shown. FIG. 4A depicts a first scene 400 and a second scene 420. The first scene 400 is a visual depiction of an environment without mixed reality processing, as seen through a display screen 404 of a headset 402. The second scene 420 is a visual depiction of the environment with mixed reality processing, as seen through the display screen 404 of the headset 402.

The headset 402 may correspond to the device 102 of FIG. 1. For example, the headset 402 may include similar components as the device 102 and may operate in a substantially similar manner as the device 102. The headset 402 includes one or more display screens 404 and one or more microphones 406. The one or more display screens 404 may correspond to the display screen 112 of FIG. 1, the display screens 302, 303 of FIG. 3, or a combination thereof. The one or more microphones 406 may correspond to the one or more microphones 106 of FIG. 1.

The one or more microphones 406 may detect sounds in the scenes 400, 420. For example, the one or more microphones 406 may detect a bird sound 410 (e.g., chirping), a human voice sound 412 (e.g., talking), and a monkey sound 414. The location of a sound source of the bird sound 410 may be determined using the audio analysis techniques described with respect to FIG. 1. For example, a processor (not shown) within the headset 402 may identify the bird sound 410 and determine that the bird sound 410 is coming from a location towards the upper-left portion of the first scene 400. The location of a sound source of the human voice sound 412 may be determined using the audio analysis techniques described with respect to FIG. 1. For example, the processor within the headset 402 may identify the human voice sound 412 and determine that the human voice sound 412 is coming from a location towards the center of the first scene 400. The location of a sound source of the monkey sound may be determined using the audio analysis techniques described with respect to FIG. 1. For example, the processor within the headset 402 may identify the monkey sound 414 and determine that the monkey sound 414 is coming from a location towards the upper-right portion of the first scene 400.

Although the sounds 410, 412, 414 are detectable by the one or more microphones 406, the sound sources may not be visible to a camera of the headset 402. For example, the bird making the bird sound 410 may be hidden from the camera by leaves in a tree, the human making the human voice sound 412 may be hidden from the camera by fog, and the monkey making the monkey sound 414 may be hidden from the camera by leaves in another tree.

The headset 402 may apply the mixed reality processing techniques of FIG. 1 to the first scene 400 to generate the second scene 420. For example, the processor may operate is a substantially similar manner as the virtual sound source generation circuitry 128 of FIG. 1 and insert a virtual bird 430 where the bird sound 410 is generated. Similarly, the processor may insert a virtual human 432 where the human voice sound 412 is generated and may insert a virtual monkey 434 where the monkey sound 414 is generated. The virtual bird 430, the virtual human 432, and the virtual monkey 434 may be displayed at the second scene 420 through the one or more display screens 404 using the mixed reality processing techniques described with respect to FIG. 1.

Thus, virtual objects 430, 432, 434 may be inserted into a scene using mixed reality processing techniques to improve user experience. For example, if a user can hear sounds, but cannot see sound sources related to the sounds, the headset 402 may insert virtual sources (visible through the one or more display screens 404) at locations proximate to where the sounds are generated to improve a user experience.

Figure 4B:
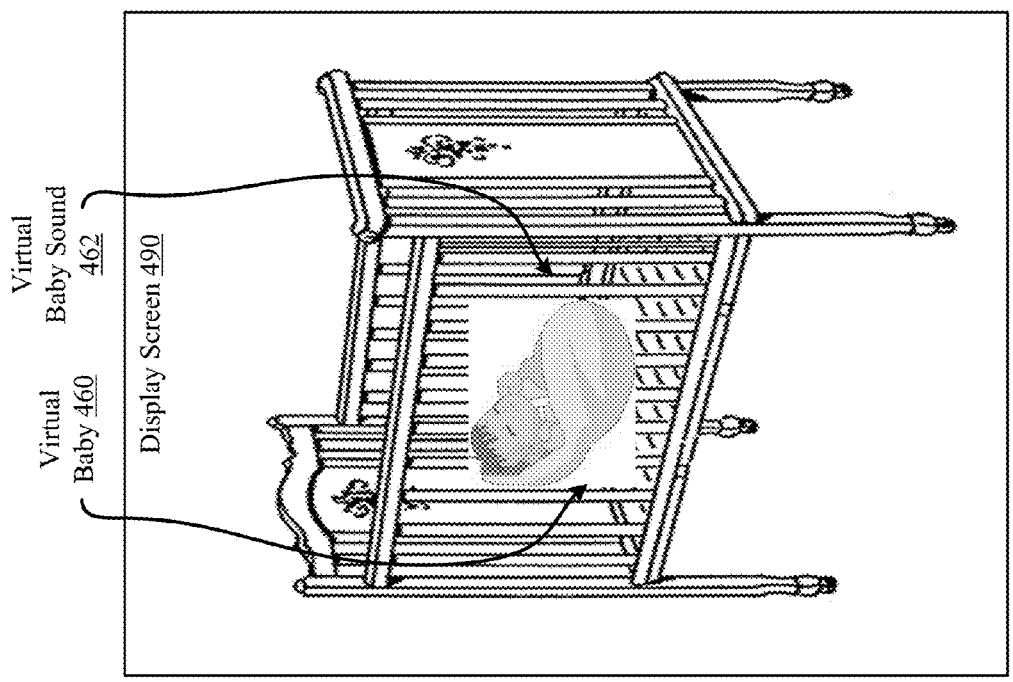
FIG. 4B depicts another example of a method of inserting one or more virtual objects into a scene based on one or more detected sounds.
Figure 4B:
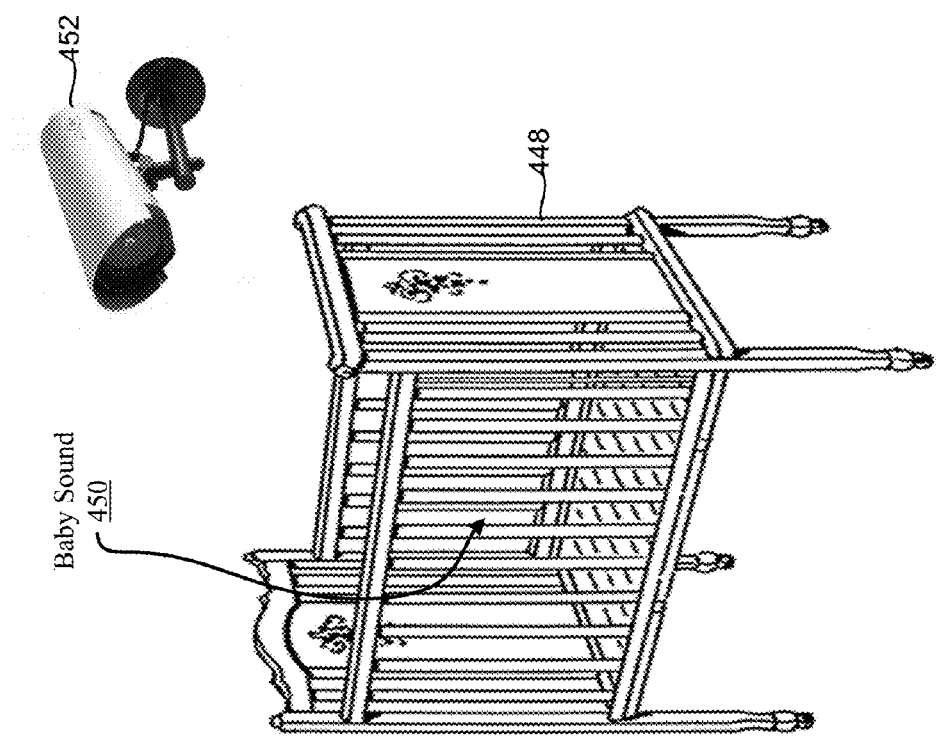

Referring to FIG. 4B, another example of inserting virtual objects into a scene based on one or more detected sounds is shown. FIG. 4B depicts a scene that is captured by a device 452 (e.g., a security camera). For example, the device 452 may capture a visual depiction of the scene. According to one implementation, the device 452 may correspond to (or be included in) the device 102 of FIG. 1. For example, the device 452 may include similar components as the device 102 and may operate in a substantially similar manner as the device 102.

The scene captured by the device 452 may include a crib 448. The device 452 may include one or more microphones (not shown) configured to detect an audio signal. For example, the one or more microphones may detect a baby sound 450. A processor within the device 452 may determine a location of a sound source of the audio signal. For example, the processor within the device 452 may determine a location of a sound source of the audio signal. To illustrate, the processor may determine a sound characteristic of the baby sound 450. The sound characteristic may include a reverberation characteristic, such as a direct-to-reverberation ratio (DRR). Based on the sound characteristic, the processor may determine a distance of the sound source from the device 452. For example, the processor may determine whether the sound source is located in a first zone (e.g., a near-field zone) or located in a second zone (e.g., a far-field zone). The processor may also estimate a direction-of-arrival of the baby sound 450. The location of the sound source may be based on the direction-of-arrival and a zone associated with the sound source. For example, the direction-of-arrival may indicate the direction of the sound source from the one or more microphones, and the zone associated with the sound source may indicate how far away the sound source is from the one or more microphones.

The device 452 may estimate one or more acoustical characteristics of the environment based on the baby sound. According to one implementation, the device may generate a virtual sound based on the one or more acoustical characteristics. For example, the device 452 may generate a virtual baby sound 462 that has one or more audio properties of a sound generate from the location of the sound source. The processor may output a sound signal at a remote location based on the virtual baby sound 462. For example, a display screen 490 may be located at a different location than the device 452 (e.g., the security camera). To illustrate, the device 452 may be located in one room of a house, and the display screen 490 may be located in another room of the house. The device 490 may output the virtual baby sound 462 at one or more speakers located in the room of the house that includes the display screen 490.

According to one implementation, the device 452 may be configured to classify the sound source as a particular object based on the audio signal. For example, the device 452 may classify the sound source of the baby sound 450 as a baby. The device 452 may generate a virtual image of the particular object. For example, the device 452 may generate a virtual baby 460. The device 452 may also insert the virtual image into a visual depiction of the environment. To illustrate, the device 452 may insert the virtual baby 460 into the visual depiction at the display screen 490. The virtual baby may be located at a particular position in the visual depiction that corresponds to the location of the sound source. For example, the virtual baby 460 may be located in the crib 448 (e.g., where the baby sound 450 is generated).

Figure 6:
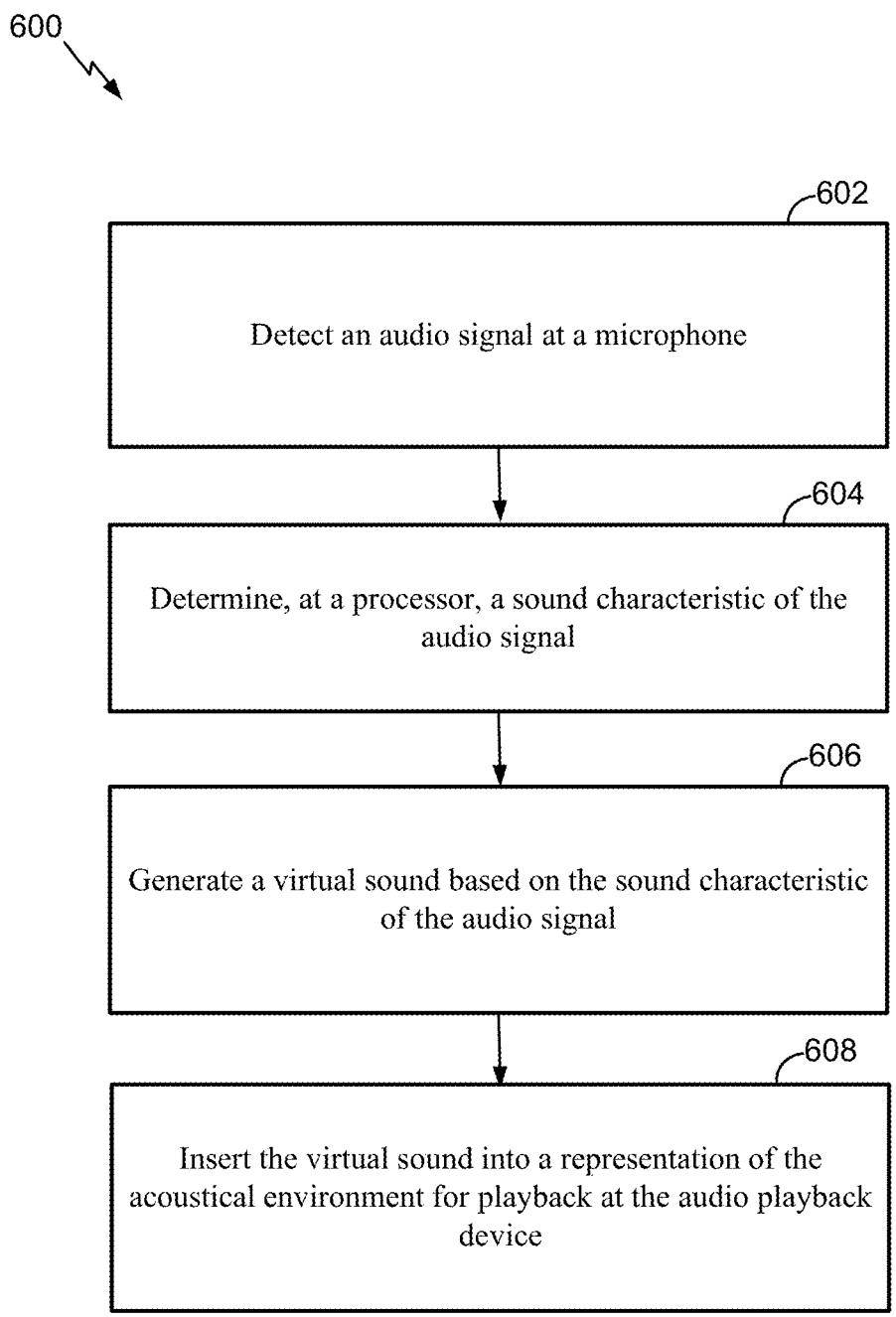
FIG. 6 is a flowchart of a method of augmenting a representation of an acoustical environment.

Referring to FIG. 6, a flowchart illustrating a method 600 of augmenting a representation of an acoustical environment is depicted. The method 600 may be performed at a device that includes a microphone and a processor, such as the device 102 of FIG. 1.

An audio signal is detected at a microphone, at 602. For example, the audio signal may correspond to the audio signal 140 or 142 of FIG. 1 detected at the microphone(s) 106 of the device 102.

A sound characteristic of the audio signal is determined at a processor, at 604. For example, the processor 114 of FIG. 1 may determine the first sound characteristic 164 based on the audio signal 140. A virtual sound is generated based on the sound characteristic of the audio signal, at 606, and the virtual sound is inserted into the representation of the acoustical environment for playback at the audio playback device, at 608. For example, the virtual sound generation circuitry 126 of FIG. 1 may generate data that represents the virtual sound and that is added to the representation 172 of the acoustical environment for playback at the audio playback device 162. Inserting the virtual sound into the representation of the acoustical environment may include outputting the virtual sound at one or more loudspeakers (e.g., earphones) of an augmented-, virtual-, or mixed-reality headset.

In some implementations, the sound characteristic may include at least one reverberation characteristic of the audio signal. The at least one reverberation characteristic may include a direct-to-reverberation ratio of the audio signal. One or more reverberation characteristics of the virtual sound may be determined based on the at least one reverberation characteristic of the audio signal, and a direction-of-arrival of the virtual sound may be estimated based on a location of a virtual sound source associated with the virtual sound. The virtual sound may be generated based on the one or more reverberation characteristics and the direction-of-arrival.

Alternatively or in addition, the method 600 may include determining, based on the sound characteristic, whether a sound source of the audio signal is located in a first zone of the acoustical environment or a second zone of the acoustical environment. The first zone (e.g., the first zone 202 of FIG. 2) may be closer to the microphone than the second zone (e.g., the second zone 204 of FIG. 2). A determination may be made as to whether a virtual sound source associated with the virtual sound is located in the first zone or the second zone. One or more characteristics of the virtual sound may be based on a location of the sound source and a location of the virtual sound source.

For example, a characteristic of the virtual sound may be substantially similar to the sound characteristic of the audio signal if the sound source is located in the first zone and the virtual sound source is located in the first zone, and the characteristic of the virtual sound may be different from the sound characteristic of the audio signal if the sound source is located in the first zone and the virtual sound source is located in the second zone. As another example, a characteristic of the virtual sound may be substantially similar to the sound characteristic of the audio signal if the sound source is located in the second zone and the virtual sound source is located in the second zone, and the characteristic of the virtual sound may be different from the sound characteristic of the audio signal if the sound source is located in the second zone and the virtual sound source is located in the first zone.

The audio signal may be generated based on user-initiated playback of an audio device. For example, the audio signal may be generated using a loudspeaker or other sound generator that is placed in the acoustical environment at or near a location of a virtual sound source of the virtual sound. The audio signal may be captured by the microphone(s) and processed to determine sound characteristics (e.g., direction of arrival, reverberation characteristics, etc.) that correspond to the location and that can be applied to a virtual sound for enhanced realism. For example, differences between the audio signal captured at the microphone(s) and the audio signal played out the loudspeaker may be identified and used to determine a transfer characteristic of sound from the location to the microphone(s).

Alternatively, the audio signal may be generated without user-initiated playback of an audio device. For example, the audio signal may be generated by a sound-producing element in the acoustical environment at or near a location of a virtual sound source of the virtual sound. One or more audio signals may be detected in sound captured by the microphone(s), and a location of one or more sources of the audio signals may be estimated. A sound characteristic of an audio signal from a source that is proximate to, or co-located with, a location of the source of the virtual sound may be used to generate the sound characteristic of the virtual sound.

In a particular implementation, the audio playback device is incorporated in a headset that is configured to generate at least one of a virtual reality scene, an augmented reality scene, or a mixed reality scene, such as described with reference to FIG. 3. A visual representation of the acoustical environment may be captured using one or more cameras and displayed at the headset, and a virtual sound source that is associated with the virtual sound may be inserted into the visual representation. In other implementations, the audio playback device may not be implemented in a headset with a visual display and may instead be incorporated in another device (e.g., a mobile phone or music player device).

Figure 7:
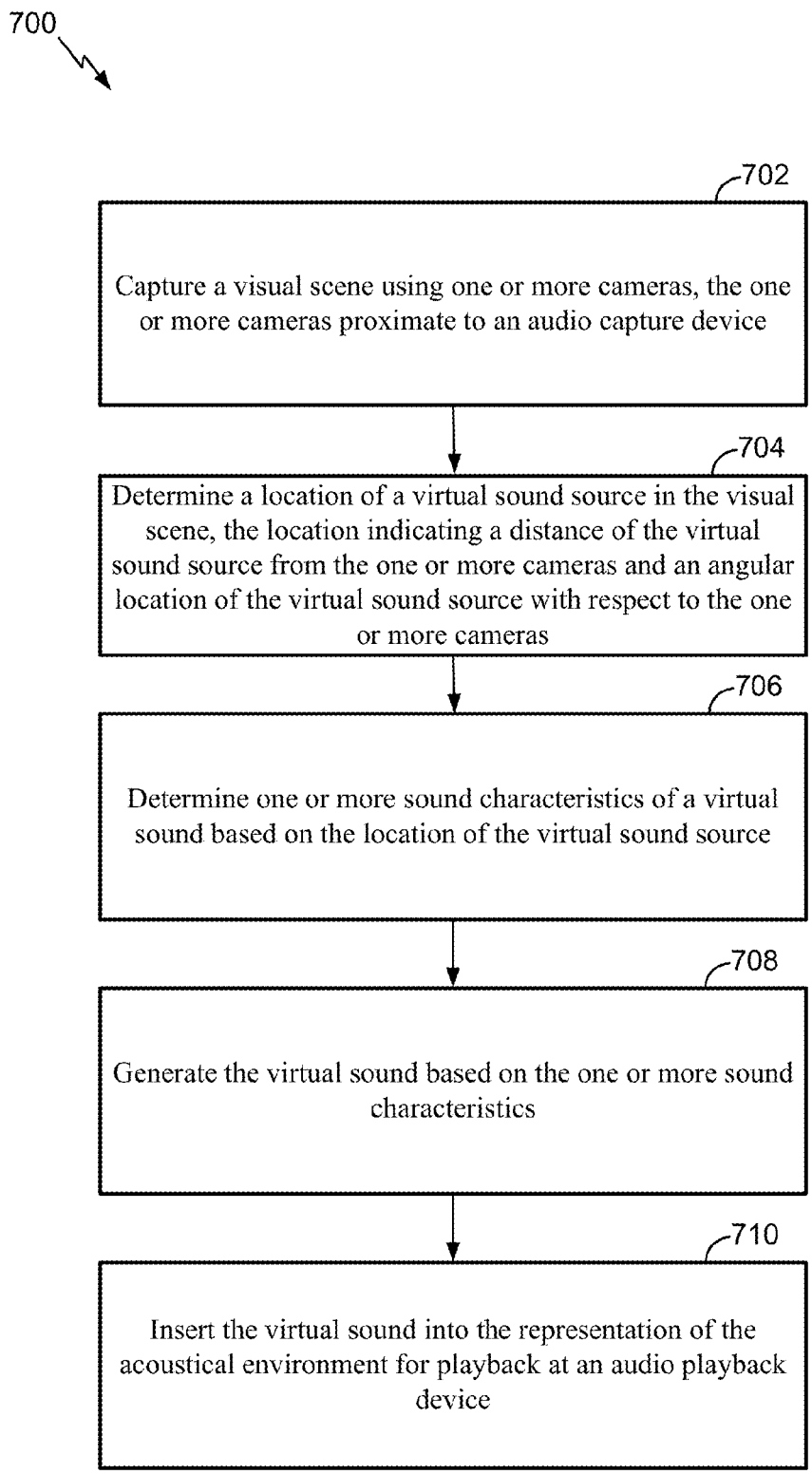
FIG. 7 is a flowchart of another method of augmenting a representation of an acoustical environment.

Referring to FIG. 7, a flowchart illustrating a method 700 of augmenting a representation of an acoustical environment is depicted. The method 700 may be performed at a device that includes a microphone and a processor, such as the device 102 of FIG. 1. As compared to FIG. 6, implementations of the method of FIG. 7 may determine a characteristic of virtual sound that is not based on a sound characteristic of a received audio signal.

A visual scene is captured using one or more cameras, at 702. The one or more cameras are proximate to an audio capture device. The audio capture device may be incorporated in a headset that is configured to generate at least one of a virtual reality scene, an augmented reality scene, or a mixed reality scene.

A location of a virtual sound source in the visual scene is determined, at 704. The location indicates a distance of the virtual sound source from the one or more cameras and an angular location of the virtual sound source with respect to the one or more cameras.

One or more sound characteristics of the virtual sound are determined based on the location of the virtual sound source, at 706. The one or more sound characteristics may include at least one reverberation characteristic of the virtual sound. In some implementations, the one or more characteristics of the virtual sound are further based on a characteristic of the acoustical environment. For example, a characteristic of the acoustical environment may be determined. The characteristic of the acoustical environment may indicate whether the acoustical environment is an indoor environment or an outdoor environment. In some implementations, the location of the virtual sound source may be compared to location information in a database that associates sound characteristics with location information, and the one or more sound characteristics of the virtual sound may be determined based on the comparison.

The virtual sound is generated based on the one or more sound characteristics, at 708, and the virtual sound is inserted into the representation of the acoustical environment for playback at the audio playback device, at 710.

The method 700 may include inserting the virtual sound source into the representation of the visual scene and displaying the representation of the visual scene. Inserting the virtual sound may include outputting a sound signal corresponding to the virtual sound at one or more loudspeakers of the headset.

Figure 8:
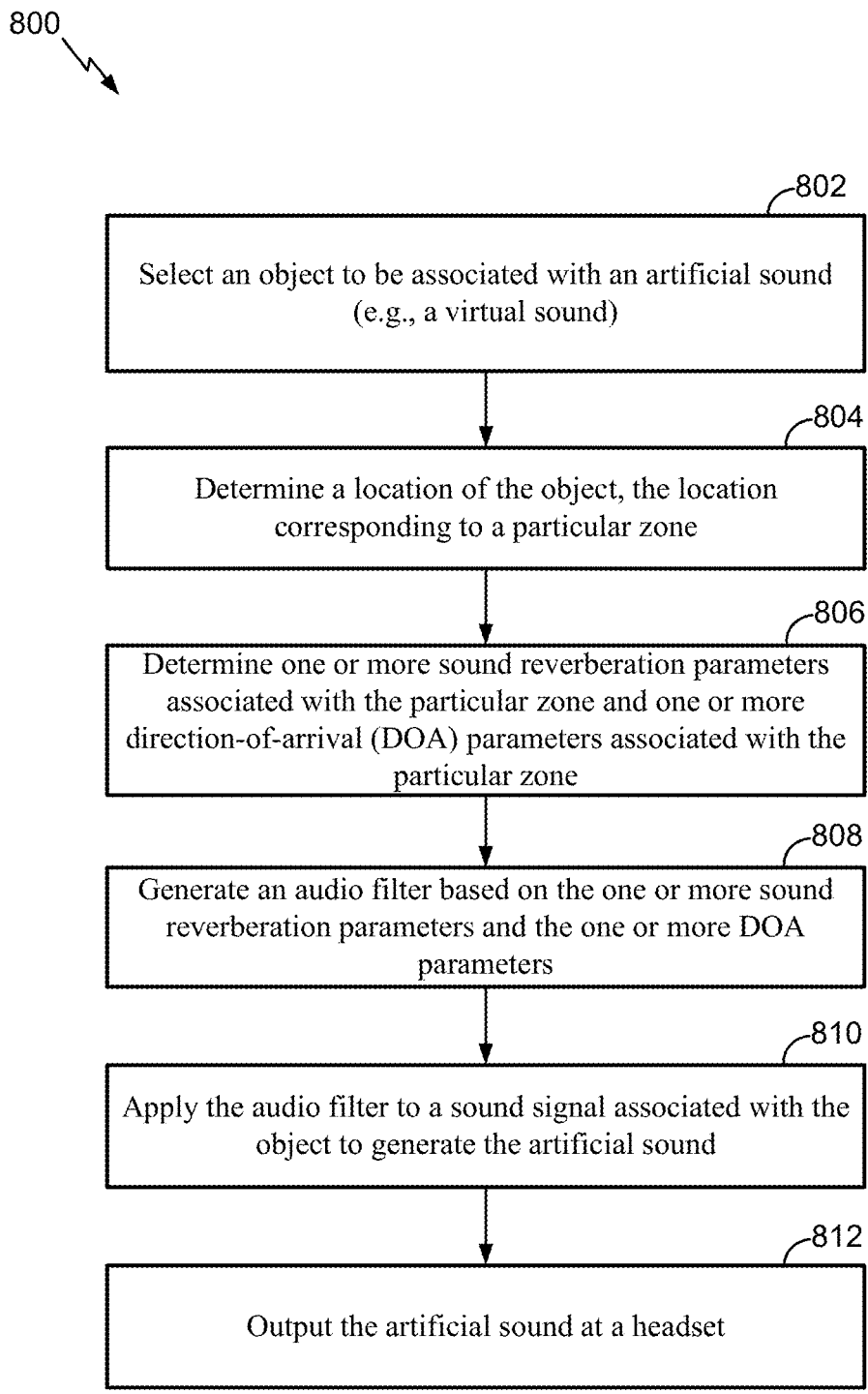
FIG. 8 is a flowchart of a method of generating artificial sound.

FIG. 8 depicts an example of a method 800 of generating a virtual audio signal. The method 800 may be performed at a device that includes an audio playback device, such as the device 102 of FIG. 1.

The method 800 includes selecting an object to be associated with an artificial sound (e.g., a virtual sound), at 802. For example, as described with reference to FIG. 3, the second tree 342 may be selected. The object may be selected based on user input, such as via identifying pointing by the user's finger at the object, tracking user eye movement or gaze toward the object, or speech recognition of the user (e.g., identifying a command to add virtual sound to the object).

A location of the object is determined, at 804. The location of the object may be determined based on a depth map or other visual processing technique. The location of the object corresponds to a particular zone, such as described with reference to FIG. 2.

At 806, one or more sound reverberation parameters associated with the particular zone and one or more direction-of-arrival (DOA) parameters associated with the particular zone are determined. For example, the sound reverberation parameters and the DOA parameters may be determined based on real-world recorded sound from the particular zone. As another example, the sound reverberation parameters and the DOA parameters may be determined based on real-world, played back sound from the particular zone. As another example, sound zone reverberation parameters based on object visual depth and DOA information and based on pre-compiled acoustic lookup tables.

At 808, an audio filter may be generated based on the one or more sound reverberation parameters and the one or more DOA parameters. The audio filter may be applied to a "clean" sound signal associated with the object to generate the artificial sound, at 810. For example, the audio filter may be generated and applied by the virtual sound source generation circuitry 128 of FIG. 1.

The artificial sound may be output at a headset, at 812, such as at the speaker(s) 110 of FIG. 1 or the loudspeakers 320-323 of FIG. 3. For example, the artificial sound may be played on headset earpieces (e.g., at loudspeakers 320-321 of FIG. 3).

Figure 9:
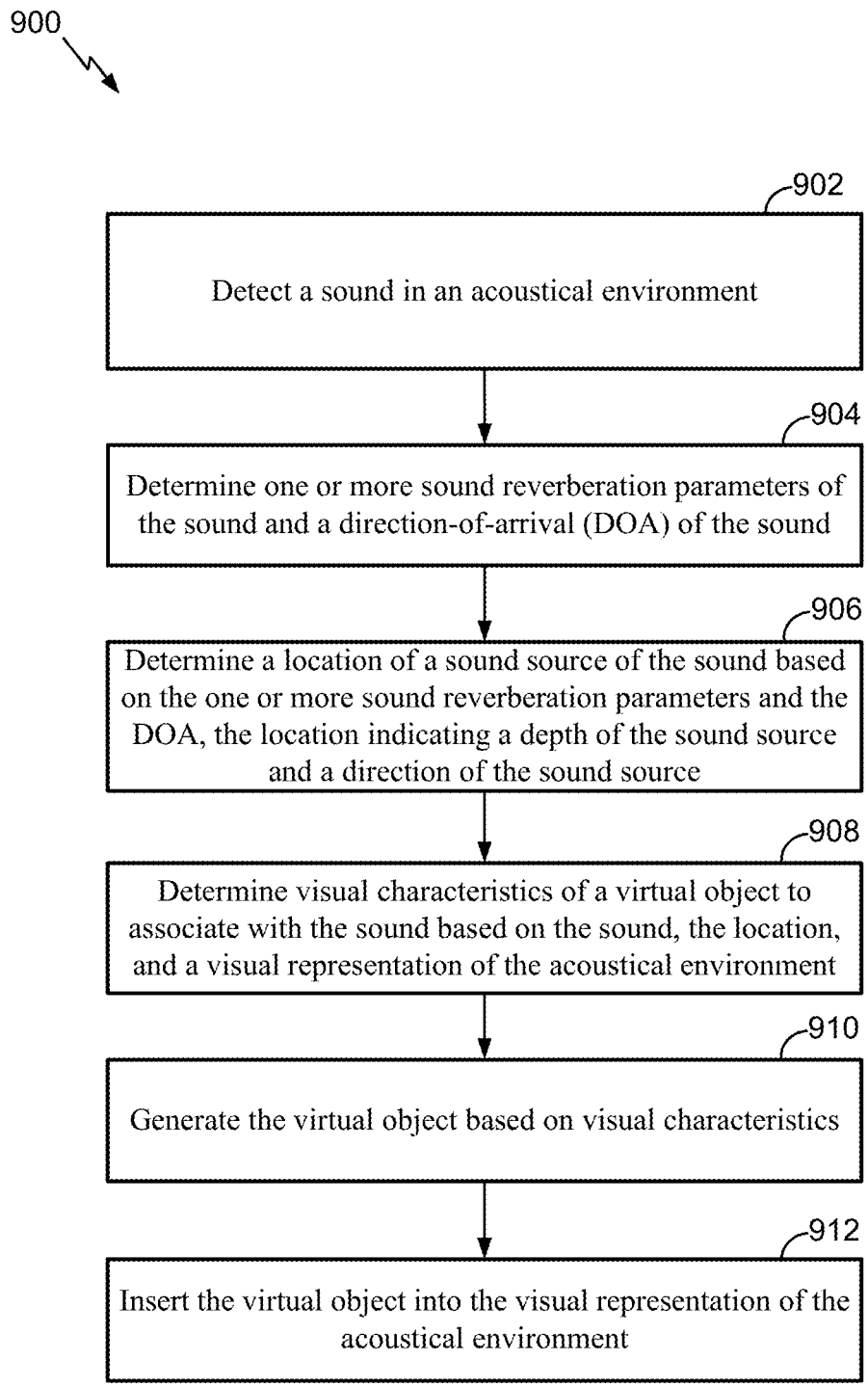
FIG. 9 is a flowchart of a method of generating a virtual object in a real-world environment.

FIG. 9 depicts an example of a method 900 of generating a virtual object in a real-world environment. The method 900 may be performed at a device that includes a video playback device, such as the device 102 of FIG. 1.

The method 900 includes detecting a sound in an acoustical environment, at 902. For example, referring to FIG. 1, the one or more microphones 106 may detect an audio signal in the acoustical environment 150.

At 904, one or more sound reverberation parameters of the sound may be determined and a direction-of-arrival (DOA) of the sound may be determined. For example, referring to FIG. 1, the audio analysis circuitry 124 may determine one or more reverberation parameters of the sound. According to one implementation, the audio analysis circuitry 124 may determine a DRR of the sound. Additionally, the location estimation circuitry 122 may determine the DOA of the sound. For example, the location estimation circuitry 122 may determine the angular location of the sound.

At 906, a location of a sound source of the sound may be determined based on the one or more sound reverberation parameters and the DOA. The location may indicate a depth of the sound source and a direction of the sound source. For example, referring to FIG. 1, location estimation circuitry may determine the location of the sound source based on the one or more sound reverberation parameters and the DOA. According to one implementation, the DRR and the angular location may be used by the processor to determine the depth and direction of the sound.

At 908, visual characteristics of a virtual object to associate with the sound may be determined. The visual object may be based on the sound, the location, and a visual representation of the acoustical environment. For example, referring to FIG. 1, the processor 114 may determine a shading scheme for the virtual object, a color scheme for the virtual object, a size scheme of the virtual object, or a combination thereof, so that the virtual object "blends" into a "real visual scene". The schemes may be based on the location. As a non-limiting example, if the processor 114 determines that the location of the sound source is relatively far away, the processor 114 may select visual characteristics that correspond to a relatively small size.

At 910, the virtual object may be generated based on the visual characteristics. For example, referring to FIG. 1, the virtual sound source generation circuitry 128 may generate the virtual object based on the visual characteristics (e.g., the different schemes) described at 908.

At 912, the virtual object may be inserted into the visual representation of the acoustical environment. For example, the video playback device 160 may insert the virtual object into the visual representation 170 of the acoustical environment 150.

The method 900 of FIG. 9 may enable virtual objects to be inserted in a visual representation of a scene to generate a visual mixed reality scene. For example, virtual objects that are not present in the "real-world" may be virtually inserted in to the visual representation to enhance user enjoyment.

Figure 10:
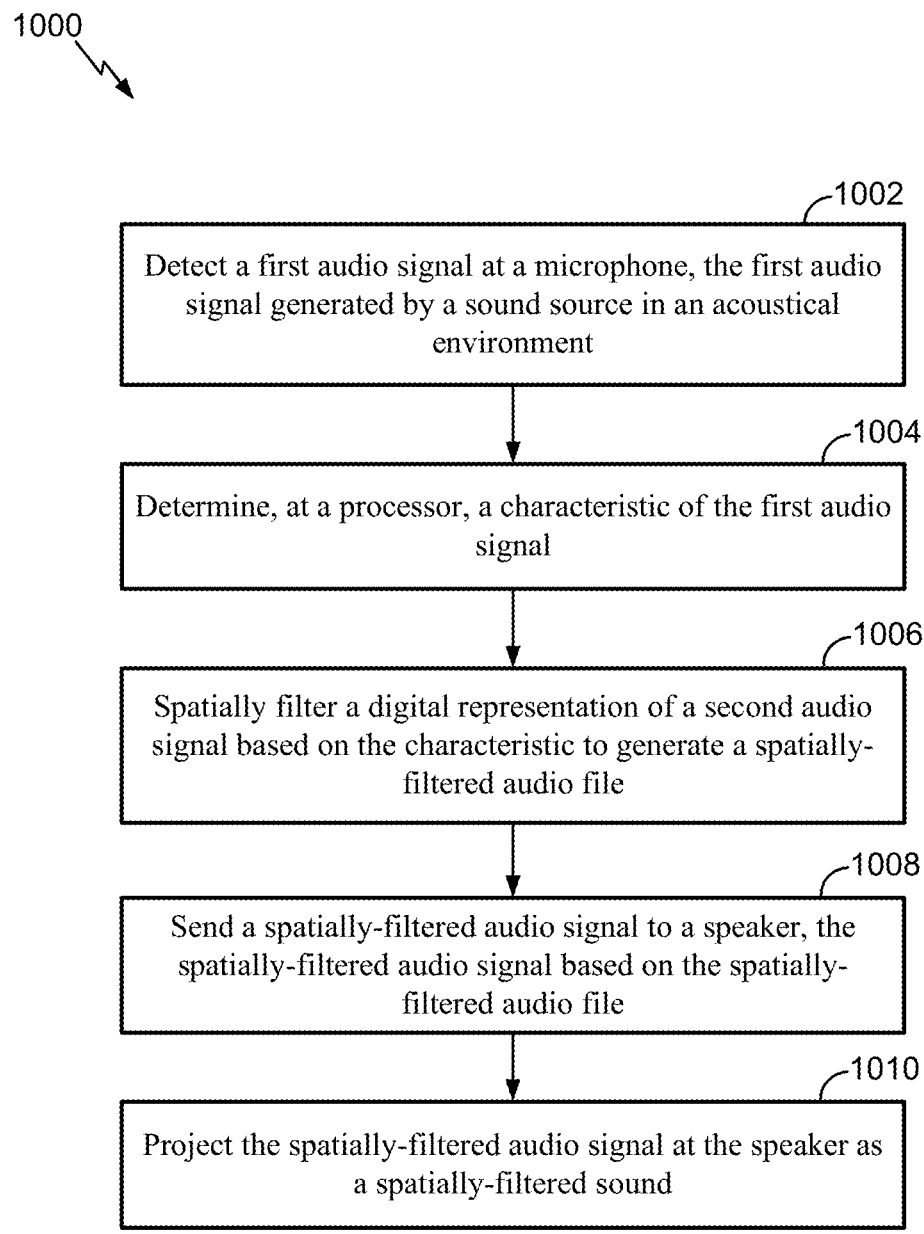
FIG. 10 is a flowchart of a method of generating a spatially-filtered sound.

FIG. 10 depicts an example of a method 1000 of generating a spatially-filtered sound. The method 1000 may be performed at a device that includes an audio playback device, such as the device 102 of FIG. 1.

The method 1000 includes detecting a first audio signal at a microphone, at 1002. The first audio signal may be generated by a sound source in an acoustical environment. For example, the audio signal may correspond to the audio signal 140 or 142 of FIG. 1 detected at the microphone(s) 106 of the device 102. The method 1000 also includes determining a characteristic of the first audio signal, at 1004. For example, referring to FIG. 1, the processor 114 may determine the sound characteristic 164 based on the audio signal 140.

The method 1000 also includes spatially filtering a digital representation of a second audio signal based on the characteristic to generate a spatially-filtered audio file, at 1006. For example, referring to FIG. 1, the virtual sound generation circuitry 126 may spatially filter the digital representation of the audio signal based on the sound characteristic 164 to generate a spatially-filtered audio file. The method 1000 also includes sending a spatially-filtered audio signal to a speaker, at 1008. The spatially-filtered audio signal may be based on the spatially-filtered audio file. For example, referring to FIG. 1, the virtual sound source generation circuitry 128 may generate a spatially-filtered audio signal based on the spatially-filtered audio file and may send the spatially-filtered audio signal to the one or more speakers 110.

The method 1000 also includes projecting the spatially-filtered audio signal at the speaker as a spatially-filtered sound, at 1010. For example, referring to FIG. 1, the one or more speakers 110 may project the spatially-filtered audio signal as spatially-filtered sound. The spatially-filtered sound may include the virtual sound 144. According to one implementation, the virtual sound 144 includes a computer-generated sound.

Figure 11:
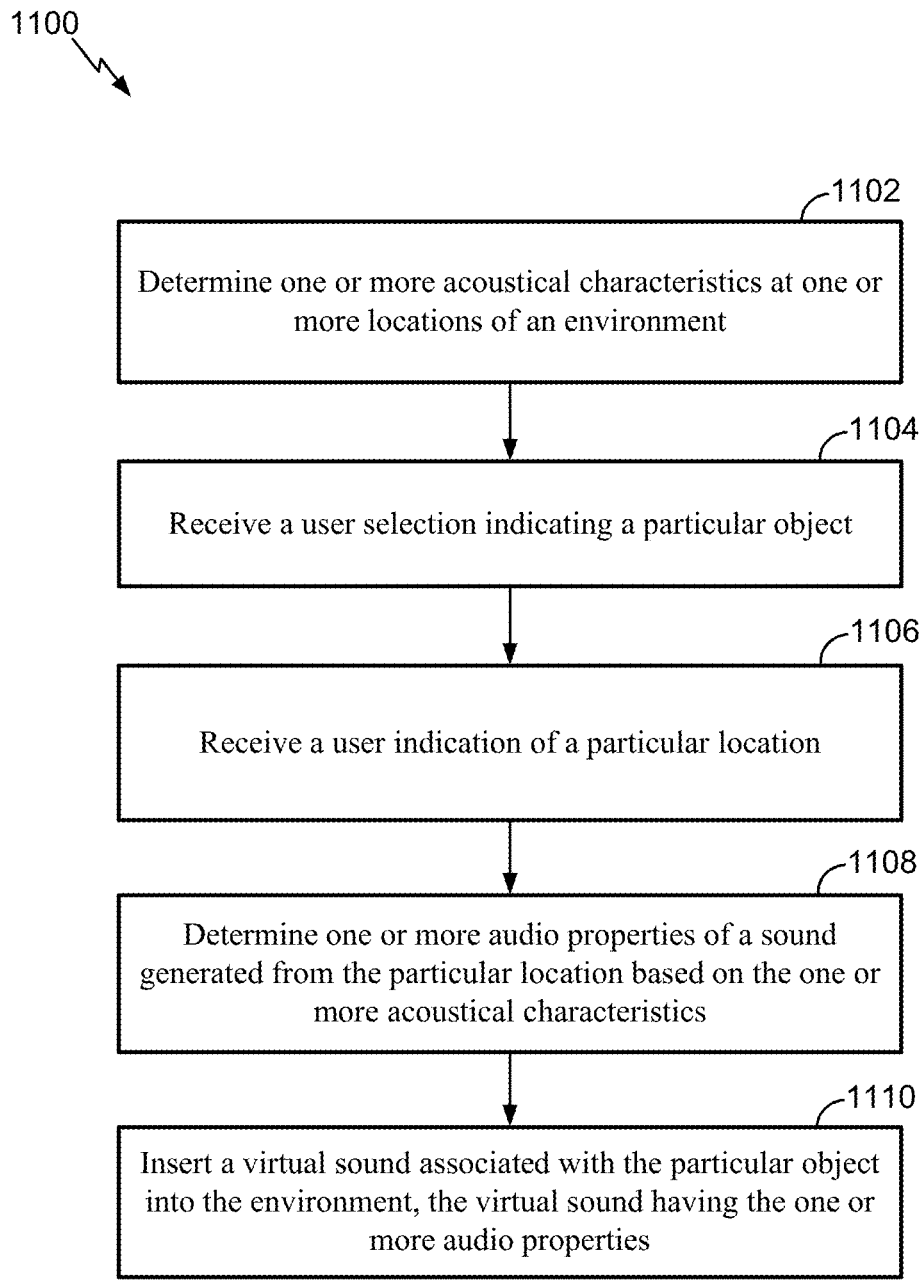
FIG. 11 is a flowchart of a method of outputting sound.

FIG. 11 depicts an example of a method 1100 of outputting sound. The method 1100 may be performed at a device that includes an audio playback device, such as the device 102 of FIG. 1.

The method 1100 includes determining one or more acoustical characteristics at one or more locations of an environment, at 1102. For example, referring to FIG. 5, the loudspeaker 502 is configured to be worn at the user's hand and may generate audio signals at different locations of the environment. To illustrate, the user may move his hand and the loudspeaker 502 may generate audio signals where the user's hand is located. The headset of the user may include one or more microphones configured to detect the audio signals projected by the loudspeaker. Based on the detected audio signals, the headset may determine one or more acoustical characteristics at different locations of the environment.

The method 1100 also includes receiving a user selection indicating a particular object, at 1104. For example, referring to FIG. 5, the headset may receive a user selection indicating that the user has selected the piano 504. The method 1100 also includes receiving a user indication of a particular location, at 1106. The wearable sensor may be configured to detect the particular location, generate the user indication of the particular location, and send the user indication of the particular location to a processor (e.g., the headset). For example, referring to FIG. 5, the headset may receive a user indication (via a wearable sensor on the user's hand) that the user is pointing at a particular location (e.g., approximately two feet in front of the user's face).

The method 1100 also includes determining one or more audio properties of a sound generated from the particular location based on the one or more acoustical characteristics, at 1108. For example, referring to FIG. 5, the headset may determine audio properties of sounds generated two feet in front of the user's face. To illustrate, when the loudspeaker 502 was approximately two feet in front of the user's face, the headset may determine the audio properties of the sound generated from the loudspeaker 502.

The method 1100 also includes inserting a virtual sound associated with the particular object into the environment, at 1110. The virtual sound has the one or more audio properties. For example, referring to FIG. 5, the headset may generate a virtual piano sound that includes the audio properties of the sound generated by the loudspeaker 502 when the loudspeaker was approximately two feet in front of the user's face. As another example, the headset may compare the one or more acoustical characteristics to one or more entries in a memory. Each entry may be associated with a different sound. The headset may retrieve the virtual sound from a particular entry based on the comparison prior to insertion of the virtual sound into the environment. After the virtual sound is generated (or retrieved from memory), the headset may insert the virtual sound (e.g., a piano sound) into the environment.

Figure 12:
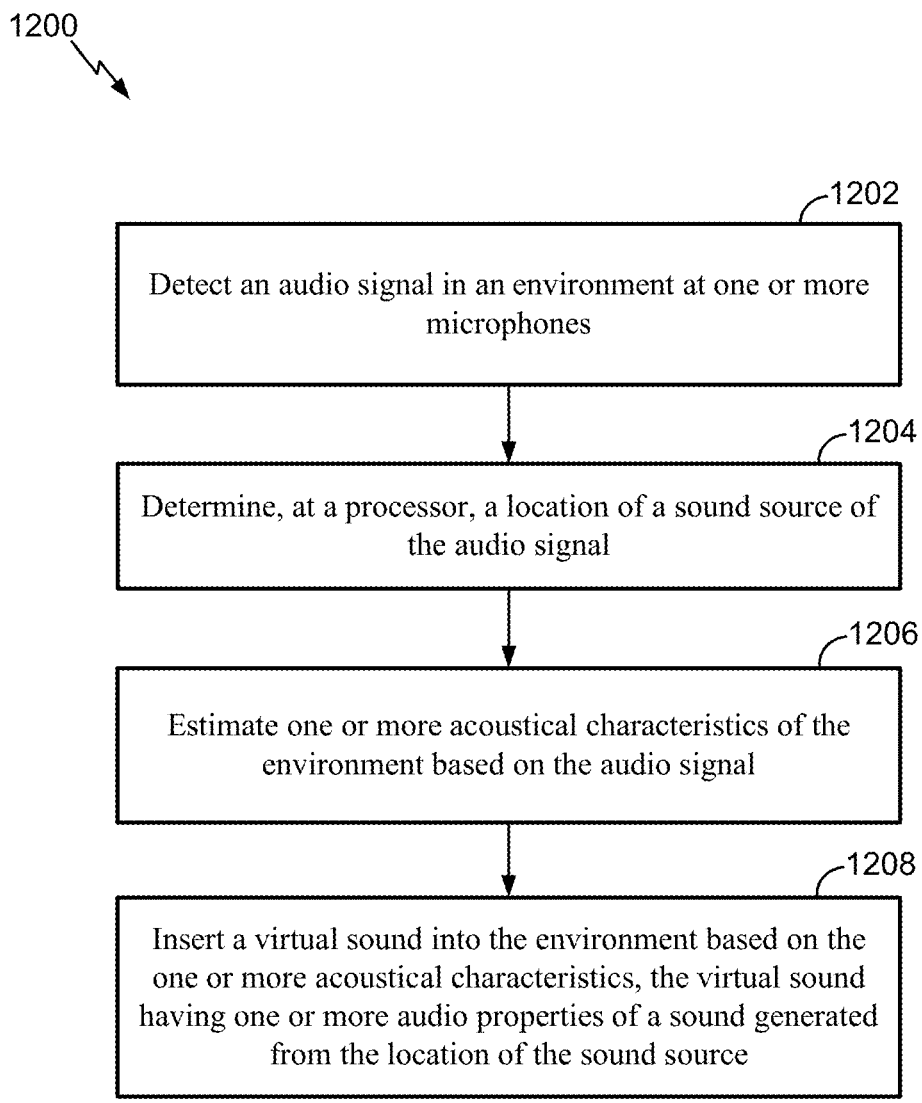
FIG. 12 is a flowchart of a method of generating virtual sound.

FIG. 12 depicts an example of a method 1200 of generating virtual sound. The method 1200 may be performed at a device that includes an audio playback device, such as the device 102 of FIG. 1.

The method 1200 includes detecting an audio signal in an environment at one or more microphones, at 1202. For example, referring to FIG. 1, the one or more microphones 106 may detect the audio signal 140. The method 1200 also includes determining, at a processor, a location of a sound source of the audio signal, at 1204. For example, referring to FIG. 1, the device 102 may determine a location of the sound source 130 of the audio signal 140. For example, the device may determine a sound characteristic of the audio signal 140. Based on the sound characteristic, the device 102 may determine whether the sound source 130 is located in a first zone of the acoustical environment 150 or a second zone of the acoustical environment 150. The first zone may be closer than the second zone.

The method 1200 also includes estimating one or more acoustical characteristics of the environment based on the audio signal, at 1206. For example, referring to FIG. 1, the audio analysis circuitry 124 may estimate one or more acoustical characteristics of the acoustical environment 150 based on the detected audio signal 140.

The method 1200 also includes inserting a virtual sound into the environment based on the one or more acoustical characteristics, at 1208. The virtual sound has one or more audio properties of a sound generated from the location of the sound source. For example, referring to FIG. 1, the virtual sound source generation circuitry 128 may generate a virtual sound based on the acoustical characteristics of the acoustical environment. As another example, the processor 114 may compare the one or more acoustical characteristics to one or more entries in the memory 104. Each entry may be associated with a different virtual sound. The processor 114 may also retrieve the virtual sound from a particular entry based on the comparison prior to insertion of the virtual sound into the environment. After the virtual sound is generated (or retrieved from memory), the virtual sound generation circuitry 126 may insert the virtual sound in the acoustical environment 150.

Figure 13:
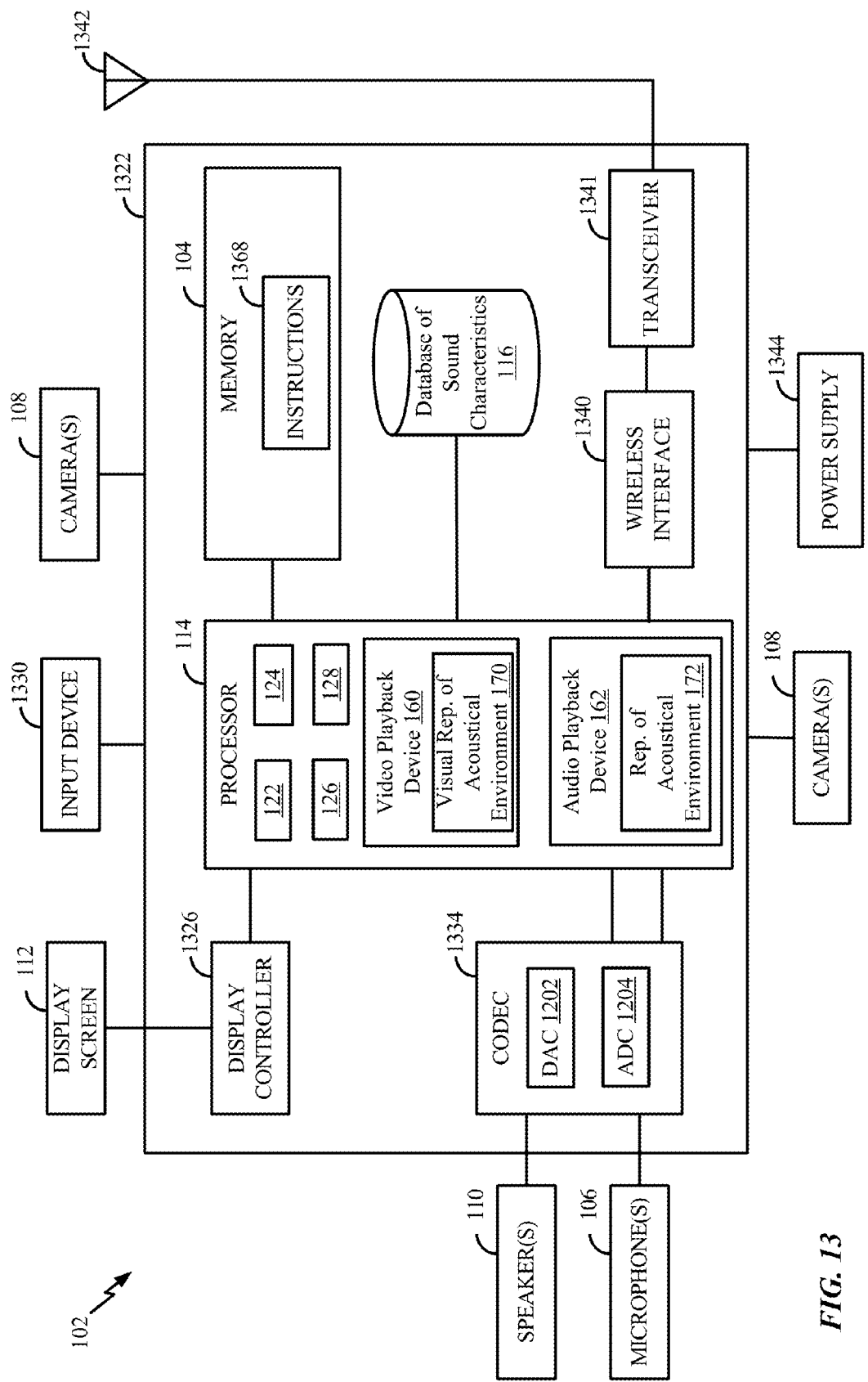
FIG. 13 illustrates a device including components operable to perform the techniques described with respect to FIGS. 1-13.

Referring to FIG. 13, a block diagram of the device 102 is depicted. In a particular implementation, the device 102 includes the processor 114 (e.g., a CPU). The processor 114 includes the location estimation circuitry 122, the audio analysis circuitry 124, the virtual sound generation circuitry 126, the virtual sound source generation circuitry 128, the video playback device 160, and the audio playback device 162.

The device 102 includes the memory 104 coupled to the processor 114. Additionally, the database of sound characteristics 116 may be coupled to (e.g., accessible by) the processor 114. The device 102 also includes a wireless interface 1340 coupled to an antenna 1342 via transceiver 1341. The device 102 may include the display screen 112 coupled to a display controller 1326. The one or more speakers 110, the one or more microphones 106, or both may be coupled to a coder/decoder (CODEC) 1334. The CODEC 1334 may include a digital-to-analog converter (DAC) 1302 and an analog-to-digital converter (ADC) 1304. In a particular implementation, the CODEC 1334 may receive analog signals from the one or more microphones 106 and convert the analog signals to digital signals using the analog-to-digital converter 1304. The CODEC 1334 may receive digital signals from the processor 114 and the CODEC 1334 may convert the digital signals to analog signals using the digital-to-analog converter 1302 and may provide the analog signals to the one or more speakers 110.

The memory 104 may include instructions 1368 executable by the processor 114, another processing unit of the device 102, or a combination thereof, to perform methods and processes disclosed herein, such as one or more of the methods 600-1000 of FIGS. 6-10. One or more components of the apparatus/systems disclosed herein may be implemented via dedicated hardware (e.g., circuitry), by a processor executing instructions (e.g., the instructions 1368) to perform one or more tasks, or a combination thereof. As an example, the memory 104 or one or more components of the processor 114 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1368) that, when executed by a computer (e.g., a processor in the CODEC 1334, the processor 114, and/or another processing unit in the device 102), may cause the computer to perform at least a portion of one or more of the methods described herein. As an example, the memory 104 or the one or more components of the processor 114 may be a non-transitory computer-readable medium that includes instructions (e.g., the instructions 1368) that, when executed by a computer (e.g., a processor in the CODEC 1334, the processor 114, and/or another processing unit), cause the computer perform at least a portion of one or more of the methods disclosed herein.

In a particular implementation, the device 102 may be included in a system-in-package or system-on-chip device 1322, such as a mobile station modem (MSM). In a particular implementation, the processor 114, the display controller 1326, the memory 104, the CODEC 1334, and the wireless interface 1340 are included in a system-in-package or the system-on-chip device 1322. In a particular implementation, an input device 1330, such as a touchscreen and/or keypad, and a power supply 1344 are coupled to the system-on-chip device 1322. Moreover, in a particular implementation, as illustrated in FIG. 13, the display screen 112, the input device 1330, the one or more speaker 110, the one or more microphones 106, the antenna 1342, the one or more cameras 108, and the power supply 1344 are external to the system-on-chip device 1322. However, each of the display screen 1328, the one or more cameras 108, the input device 1330, the one or more speakers 110, the one or more microphones 106, the antenna 1342, and the power supply 1344 can be coupled to a component of the system-on-chip device 1322, such as an interface or a controller. In an illustrative example, the device 102 corresponds to a headset, a mobile communication device, a smartphone, a cellular phone, a laptop computer, a computer, a tablet computer, a personal digital assistant, a display device, a television, a gaming console, a music player, a radio, a digital video player, an optical disc player, a tuner, a camera, a navigation device, a decoder system, an encoder system, a device within a manned or unmanned vehicle, such as an automobile or an aerial vehicle, or any combination thereof.

In conjunction with the described implementations, a first apparatus to generate virtual sound includes means for detecting an audio signal in an environment. For example, the means for detecting the audio signal may include the one or more microphones 106 of FIGS. 1 and 13, one or more other sensors, or a combination thereof.

The first apparatus may also include means for determining a location of a sound source of an audio signal in an environment. For example, the means for determining the location of the sound source may include the location estimation circuitry 122 of FIGS. 1 and 13, the processor of FIGS. 1 and 13, one or more other devices, or a combination thereof.

The first apparatus may also include means for estimating one or more acoustical characteristics of the environment based on the audio signal. For example, the means for estimating the acoustical characteristics may include the audio analysis circuitry 124 of FIGS. 1 and 13, the processor of FIGS. 1 and 13, one or more other devices, or a combination thereof.

The first apparatus may also include means for inserting a virtual sound into the environment based on the one or more acoustical characteristics. The virtual sound may have one or more audio properties of a sound generate from the location of the sound source. For example, the means for inserting the virtual sound into the environment may include the virtual sound generation circuitry 126 of FIGS. 1 and 13, the processor of FIGS. 1 and 13, one or more other devices, or a combination thereof.

In conjunction with the described implementations, a second apparatus to output sound includes means for determining one or more acoustical characteristics at one or more locations of an environment. For example, the means for determining the one or more acoustical characteristics may include the audio analysis circuitry 124 of FIGS. 1 and 13, the processor of FIGS. 1 and 13, one or more other devices, or a combination thereof.

The second apparatus may also include means for receiving a user selection indicating a particular object. For example, the means for receiving the user selection may include a user interface (e.g., the input device 1330 of FIG. 13), one or more other devices, or a combination thereof.

The second apparatus may also include means for receiving a user indication of a particular location. For example, the means for receiving the user indication may include a user interface (e.g., the input device 1330 of FIG. 13), one or more other devices, or a combination thereof.

The second apparatus may also include means for determining one or more audio properties of a sound generated from the particular location based on the one or more acoustical characteristics. For example, the means for determining the one or more audio properties may include the audio analysis circuitry 124 of FIGS. 1 and 13, the processor of FIGS. 1 and 13, one or more other devices, or a combination thereof.

The second apparatus may also include means for inserting a virtual sound associated with the particular object into the environment. The virtual sound may have the one or more audio properties. For example, the means for inserting the virtual sound into the environment may include the virtual sound generation circuitry 126 of FIGS. 1 and 13, the processor of FIGS. 1 and 13, one or more other devices, or a combination thereof.

The second apparatus may also include means for detecting the particular location, generating the user indication of the particular location, and sending the user indication of the particular location to the means for receiving the user indication. For example, the means for detecting, generating, and sending may include a wearable sensor, one or more other devices, or a combination thereof.

In conjunction with the described implementations, a third apparatus to augment a representation of an acoustical environment includes means for detecting an audio signal. For example, the means for detecting may include the one or more microphones 106 of FIGS. 1 and 13, one or more other sensors, or a combination thereof.

The third apparatus may also include means for determining a sound characteristic of the audio signal. For example, the means for determining the sound characteristic may include the audio analysis circuitry 124 of FIGS. 1 and 13, the processor 114 of FIGS. 1 and 13, one or more other devices, a processor executing instructions at a non-transitory computer readable storage medium, or a combination thereof.

The third apparatus may also include means for generating a virtual sound based on the sound characteristic of the audio signal. For example, the means for generating the virtual sound may include the virtual sound generation circuitry 126 of FIGS. 1 and 13, the processor 114 of FIGS. 1 and 13, one or more other devices, a processor executing instructions at a non-transitory computer readable storage medium, or a combination thereof.

The third apparatus may also include means for outputting a sound signal based on the virtual sound for playback by the audio playback device. For example, the means for outputting may include the one or more speakers 110 of FIGS. 1 and 13, one or more other sensors, or a combination thereof.

In conjunction with the described implementations, a fourth apparatus to generate a virtual sound includes means for capturing a visual scene. The means for capturing may be proximate to an audio capture device. For example, the means for capturing may include the one or more cameras 108 of FIGS. 1 and 13, one or more other sensors, or a combination thereof.

The fourth apparatus may also include means for determining a location of a virtual sound source in the visual scene. The location may indicate a distance of the virtual sound source from the means for capturing and an angular location of the virtual sound source with respect to the means for capturing. For example, the means for determining the location of the virtual sound source may include the location estimation circuitry 122 of FIGS. 1 and 13, the processor 114 of FIGS. 1 and 13, one or more other devices, a processor executing instructions at a non-transitory computer readable storage medium, or a combination thereof.

The fourth apparatus may also include means for determining one or more sound characteristics of the virtual sound based on the location of the virtual sound source. For example, the means for determining the one or more sound characteristics may include the audio analysis circuitry 124 of FIGS. 1 and 13, the virtual sound generation circuitry 126 of FIGS. 1 and 13, the database of sound characteristics 116 of FIGS. 1 and 13, the processor 114 of FIGS. 1 and 13, one or more other devices, a processor executing instructions at a non-transitory computer readable storage medium, or a combination thereof.

The fourth apparatus may also include means for generating the virtual sound based on the one or more sound characteristics. For example, the means for generating the virtual sound may include the virtual sound generation circuitry 126 of FIGS. 1 and 13, the processor 114 of FIGS. 1 and 13, one or more other devices, a processor executing instructions at a non-transitory computer readable storage medium, or a combination thereof.

The fourth apparatus may also include means for outputting a sound signal based on the virtual sound. For example, the means for outputting may include the one or more speakers 110 of FIGS. 1 and 13, one or more other sensors, or a combination thereof.

In conjunction with the described implementations, a fifth apparatus includes means for detecting a first audio signal. The first audio signal may be generated by a sound source in an acoustical environment. For example, the means for detecting may include the one or more microphones 106 of FIGS. 1 and 13, one or more other sensors, or a combination thereof.

The fifth apparatus may also include means for determining a characteristic of the first audio signal. For example, the means for determining the characteristic may include the audio analysis circuitry 124 of FIGS. 1 and 13, the processor 114 of FIGS. 1 and 13, one or more other devices, a processor executing instructions at a non-transitory computer readable storage medium, or a combination thereof.

The fifth apparatus may also include means for spatially filtering a digital representation of a second audio signal based on the characteristic to generate a spatially-filtered audio file. For example, the means for spatially filtering may include the virtual sound generation circuitry 126 of FIGS. 1 and 13, the processor 114 of FIGS. 1 and 13, one or more other devices, a processor executing instructions at a non-transitory computer readable storage medium, or a combination thereof.

The fifth apparatus may also include means for projecting spatially-filtered sound. The spatially-filtered sound may be based on a spatially-filtered audio signal sent to the means for projecting, and the spatially-filtered audio signal may be based on the spatially-filtered audio file. For example, the means for projecting may include the one or more speakers 110 of FIGS. 1 and 13, one or more other sound output devices, or a combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus for outputting virtual sound, the apparatus comprising:
one or more microphones configured to detect an audio signal in an environment; and
a processor coupled to the one or more microphones, the processor configured to:
determine a sound characteristic of the audio signal;
determine, based on the sound characteristic, whether a sound source of the audio signal is located in a first zone of the environment or a second zone of the environment, the first zone closer to the one or more microphones than the second zone;
estimate a direction-of-arrival of the audio signal;
estimate a location of the sound source based on the direction-of-arrival and at least one of the zones associated with the sound source; and
insert a virtual sound into the environment, the virtual sound having one or more audio properties of a sound generated from the location of the sound source.

2. The apparatus of claim 1, wherein the processor is further configured to generate the virtual sound prior to insertion of the virtual sound into the environment.

3. The apparatus of claim 1, wherein the processor is further configured to:
compare one or more acoustical characteristics of the environment to one or more entries in a memory, each entry associated with a different virtual sound; and
retrieve the virtual sound from a particular entry based on the comparison prior to insertion of the virtual sound into the environment.

4. The apparatus of claim 1, wherein the processor is further configured to:
classify the sound source as a particular object based on the audio signal;
generate a virtual image of the particular object; and
insert the virtual image at the location of the sound source in the environment.

5. The apparatus of claim 1, further comprising a camera coupled to the processor, the camera configured to capture the environment.

6. The apparatus of claim 5, wherein the camera includes a security camera.

7. The apparatus of claim 5, wherein the camera, the one or more microphones, and the processor are integrated into a headset.

8. The apparatus of claim 7, wherein the headset is configured to display a visual depiction of the environment.

9. The apparatus of claim 1, wherein the sound characteristic comprises at least one reverberation characteristic of the audio signal.

10. The apparatus of claim 9, wherein the at least one reverberation characteristic comprises a direct-to-reverberation ratio of the audio signal.

11. The apparatus of claim 1, wherein the processor is configured to:
spatially filter a digital representation of a particular sound based on the one or more audio properties to generate a spatially-filtered audio file, the particular sound corresponding to the virtual sound; and
send a spatially-filtered audio signal to a speaker, the spatially-filtered audio signal based on the spatially-filtered audio file, wherein the speaker projects the spatially-filtered audio signal as a spatially-filtered sound to insert the virtual sound into the environment.

12. The apparatus of claim 1, wherein the one or more audio properties correspond to a volume level of the sound generated from the location of the sound source, a direction-of-arrival of the sound generated from the location of the sound source, or both.

13. A method for outputting virtual sound, the method comprising:

detecting an audio signal in an environment at one or more microphones;
determining, at a processor, a sound characteristic of the audio signal;
determining, based on the sound characteristic, whether a sound source of the audio signal is located in a first zone of the environment or a second zone of the environment, the first zone closer to the one or more microphones than the second zone;
estimating a direction-of-arrival of the audio signal;
estimating a location of the sound source based on the direction-of-arrival and at least one of the zones associated with the sound source;
and
inserting a virtual sound into the environment, the virtual sound having one or more audio properties of a sound generated from the location of the sound source.

14. The method of claim 13, further comprising generating the virtual sound prior to insertion of the virtual sound into the environment.

15. The method of claim 13, further comprising:
comparing one or more acoustical characteristics of the environment to one or more entries in a memory, each entry associated with a different virtual sound; and
retrieving the virtual sound from a particular entry based on the comparison prior to insertion of the virtual sound into the environment.

16. The method of claim 13, further comprising:
classifying the sound source as a particular object based on the audio signal;
generating a virtual image of the particular object; and
inserting the virtual image at the location of the sound source in the environment.

17. The method of claim 13, further comprising capturing the environment via a camera.

18. The method of claim 17, wherein the camera includes a security camera.

19. The method of claim 17, wherein the camera, the one or more microphones, and the processor are integrated into a headset.

20. The method of claim 19, further comprising displaying a visual depiction of the environment at the headset.

21. The method of claim 13, wherein the sound characteristic comprises at least one reverberation characteristic of the audio signal.

22. The method of claim 21, wherein the at least one reverberation characteristic comprises a direct-to-reverberation ratio of the audio signal.

23. The method of claim 13, wherein inserting the virtual sound into the environment comprises:
spatially filtering a digital representation of a particular sound based on the one or more audio properties to generate a spatially-filtered audio file, the particular sound corresponding to the virtual sound; and
sending a spatially-filtered audio signal to a speaker, the spatially-filtered audio signal based on the spatially-filtered audio file, wherein the speaker projects the spatially-filtered audio signal as a spatially-filtered sound to insert the virtual sound into the environment.

24. A non-transitory computer-readable medium comprising instructions for outputting virtual sound, the instructions, when executed by a processor, cause the processor to perform operations comprising:
determining a sound characteristic of an audio signal in an environment, the audio signal detected at one or more microphones;
determining, based on the sound characteristic, whether a sound source of the audio signal is located in a first zone of the environment or a second zone of the environment, the first zone closer to the one or more microphones than the second zone;
estimating a direction-of-arrival of the audio signal;
estimating a location of the sound source based on the direction-of-arrival and at least one of the zones associated with the sound source;
and
inserting a virtual sound into the environment, the virtual sound having one or more audio properties of a sound generated from the location of the sound source.

25. The non-transitory computer-readable medium of claim 24, wherein the operations further comprise generating the virtual sound prior to insertion of the virtual sound into the environment.

26. The non-transitory computer-readable medium of claim 24, wherein the operations further comprise:
comparing one or more acoustical characteristics of the environment to one or more entries in a memory, each entry associated with a different virtual sound; and
retrieving the virtual sound from a particular entry based on the comparison prior to insertion of the virtual sound into the environment.

27. The non-transitory computer-readable medium of claim 24, wherein the operations further comprise:
classifying the sound source as a particular object based on the audio signal;
generating a virtual image of the particular object; and
inserting the virtual image at the location of the sound source in the environment.

28. The non-transitory computer-readable medium of claim 24, wherein the operations further comprise causing a camera to capture the environment.

29. The non-transitory computer-readable medium of claim 28, wherein the camera includes a security camera.

30. The non-transitory computer-readable medium of claim 24, wherein inserting the virtual sound into the environment comprises:
spatially filtering a digital representation of a particular sound based on the one or more audio properties to generate a spatially-filtered audio file, the particular sound corresponding to the virtual sound; and
sending a spatially-filtered audio signal to a speaker, the spatially-filtered audio signal based on the spatially-filtered audio file, wherein the speaker projects the spatially-filtered audio signal as a spatially-filtered sound to insert the virtual sound into the environment.

31. An apparatus for outputting virtual sound, the apparatus comprising:
means for detecting an audio signal in an environment;
means for determining a sound characteristic of the audio signal;
means for determining, based on the sound characteristic, whether a sound source of the audio signal is located in a first zone of the environment or a second zone of the environment, the first zone closer to the means for detecting than the second zone;
means for estimating a direction-of-arrival of the audio signal;
means for estimating a location of the sound source based on the direction-of-arrival and at least one of the zones associated with the sound source;
and means for inserting a virtual sound into the environment, the virtual sound having one or more audio properties of a sound generated from the location of the sound source.

32. The apparatus of claim 31, further comprising:
means for classifying the sound source as a particular object based on the audio signal;
means for generating a virtual image of the particular object; and
means for inserting the virtual image at the location of the sound source in the environment.

33. The apparatus of claim 31, wherein inserting the virtual sound into the environment comprises:
spatially filtering a digital representation of a particular sound based on the one or more audio properties to generate a spatially-filtered audio file, the particular sound corresponding to the virtual sound; and
sending a spatially-filtered audio signal to a speaker, the spatially-filtered audio signal based on the spatially-filtered audio file, wherein the speaker projects the spatially-filtered audio signal as a spatially-filtered sound to insert the virtual sound into the environment.

34. An apparatus for outputting sound, the apparatus comprising:
one or more speakers configured to generate audio signals at different locations of an environment;
one or more microphones configured to detect each audio signal;
a memory; and
a processor coupled to the memory, to the one or more speakers, and to the one or more microphones, the processor configured to:
determine one or more acoustical characteristics at one or more locations of the environment based on detected audio signals generated by the one or more speakers;
receive a user selection indicating a particular object;
receive a user indication of a particular location;
determine one or more audio properties of a sound generated from the particular location based on the one or more acoustical characteristics; and
insert a virtual sound associated with the particular object into the environment, the virtual sound having the one or more audio properties.

35. The apparatus of claim 34, wherein the processor is further configured to generate the virtual sound prior to insertion of the virtual sound into the environment.

36. The apparatus of claim 34, wherein the processor is further configured to:
compare the one or more acoustical characteristics to one or more entries in a memory, each entry associated with a different virtual sound; and
retrieve the virtual sound from a particular entry based on the comparison prior to insertion of the virtual sound into the environment.

37. The apparatus of claim 34, further comprising a wearable sensor coupled to the processor, the wearable sensor configured to:
detect the particular location; and
generate the user indication of the particular location; and
send the user indication of the particular location to the processor.

38. The apparatus of claim 37, wherein the wearable sensor is further configured to be worn at a user's hand.

39. The apparatus of claim 34, wherein the one or more speakers are further configured to be worn at a user's hand.

40. A method for outputting sound, the method comprising:
generating audio signals at different locations of an environment using one or more speakers;
detecting each audio signal using one or more microphones;
determining one or more acoustical characteristics at one or more locations of the environment based on detected audio signals generated by the one or more speakers;
receiving a user selection indicating a particular object;
receiving a user indication of a particular location;
determining one or more audio properties of a sound generated from the particular location based on the one or more acoustical characteristics; and
inserting a virtual sound associated with the particular object into the environment, the virtual sound having the one or more audio properties.

41. The method of claim 40, further comprising generating the virtual sound prior to insertion of the virtual sound into the environment.

42. The method of claim 40, further comprising:
comparing the one or more acoustical characteristics to one or more entries in a memory, each entry associated with a different virtual sound; and
retrieving the virtual sound from a particular entry based on the comparison prior to insertion of the virtual sound into the environment.

43. The method of claim 40, further comprising:
detecting the particular location using a wearable sensor;
generating, at the wearable sensor, the user indication of the particular location; and
sending the user indication of the particular location from the wearable sensor to a processor.

44. The method of claim 43, wherein the wearable sensor is configured to be worn at a user's hand.

45. The method of claim 40, wherein the one or more speakers are configured to be worn at a user's hand.

46. A non-transitory computer-readable medium comprising instructions for outputting sound, the instructions, when executed by a processor, cause the processor to perform operations comprising:
initiating generation of audio signals at different locations of an environment using one or more speakers;
detecting each audio signal using one or more microphones;
determining one or more acoustical characteristics at one or more locations of the environment based on detected audio signals generated by the one or more speakers;
receiving a user selection indicating a particular object;
receiving a user indication of a particular location;
determining one or more audio properties of a sound generated from the particular location based on the one or more acoustical characteristics; and
inserting a virtual sound associated with the particular object into the environment, the virtual sound having the one or more audio properties.

47. The non-transitory computer-readable medium of claim 46, wherein the operations further comprise generating the virtual sound prior to insertion of the virtual sound into the environment.

48. The non-transitory computer-readable medium of claim 46, wherein the operations further comprise:
comparing the one or more acoustical characteristics to one or more entries in a memory, each entry associated with a different virtual sound; and retrieving the virtual sound from a particular entry based on the comparison prior to insertion of the virtual sound into the environment.

49. The non-transitory computer-readable medium of claim 46, wherein the user indication of the particular location is received from a wearable sensor.

50. The non-transitory computer-readable medium of claim 49, wherein the wearable sensor is configured to be worn at a user's hand.

51. The non-transitory computer-readable medium of claim 46, wherein the one or more speakers are further configured to be worn at a user's hand.

52. An apparatus for outputting sound, the apparatus comprising:
means for generating audio signals at different locations of an environment;
means for detecting each audio signal;
means for determining one or more acoustical characteristics at one or more locations of the environment based on detected audio generated by means for generating;
means for receiving a user selection indicating a particular object;
means for receiving a user indication of a particular location;
means for determining one or more audio properties of a sound generated from the particular location based on the one or more acoustical characteristics; and
means for inserting a virtual sound associated with the particular object into the environment, the virtual sound having the one or more audio properties.

53. The apparatus of claim 52, further comprising means for generating the virtual sound prior to insertion of the virtual sound into the environment.

54. The apparatus of claim 52, further comprising:
means for comparing the one or more acoustical characteristics to one or more entries in a memory, each entry associated with a different virtual sound; and
means for retrieving the virtual sound from a particular entry based on the comparison prior to insertion of the virtual sound into the environment.

55. The apparatus of claim 52, further comprising means for detecting the particular location, generating the user indication of the particular location, and sending the user indication of the particular location to the means for receiving the user indication.

56. The apparatus of claim 55, wherein the means for detecting the particular location is configured to be worn at a user's hand.

57. The apparatus of claim 52, wherein the means for generating the audio signals is configured to be worn at a user's hand.

* * * * *